United States Patent
Thomas et al.

(10) Patent No.: US 7,590,763 B2
(45) Date of Patent: Sep. 15, 2009

(54) DEVICE FOR USE IN A SYSTEM FOR PROCESSING KEYBOARD, VIDEO AND MOUSE SIGNALS

(75) Inventors: Christopher L Thomas, Madison, AL (US); Steven Brown, Huntsville, AL (US); Philip M Kirshtein, New Market, AL (US)

(73) Assignee: Avocent Corporation, Huntsville, AL (US)

( * ) Notice: Subject to any disclaimer, the term of this patent is extended or adjusted under 35 U.S.C. 154(b) by 0 days.

(21) Appl. No.: 11/123,075

(22) Filed: May 6, 2005

(65) Prior Publication Data

US 2005/0204082 A1   Sep. 15, 2005

Related U.S. Application Data

(63) Continuation of application No. 09/951,774, filed on Sep. 14, 2001, now Pat. No. 7,424,551.

(60) Provisional application No. 60/279,461, filed on Mar. 29, 2001.

(51) Int. Cl.
*G06F 13/12* (2006.01)

(52) U.S. Cl. .............................. 710/2; 710/73; 710/62; 439/502

(58) Field of Classification Search ............... 439/502; 710/100, 300, 301, 62, 63
See application file for complete search history.

(56) References Cited

U.S. PATENT DOCUMENTS

| | | | |
|---|---|---|---|
| 2,667,553 A | 1/1954 | Moorhead et al. |
| 2,870,287 A | 1/1959 | Corbitt et al. |
| 4,103,252 A | 7/1978 | Bobick |
| 4,395,610 A | 7/1983 | Downs et al. |
| 4,919,117 A | 4/1990 | Muchisky et al. |
| 4,927,787 A | 5/1990 | Patel |
| 4,927,987 A | 5/1990 | Kirchgessner |
| 5,033,813 A | 7/1991 | Westfall |
| 5,188,542 A | 2/1993 | Ballman |
| 5,192,226 A | 3/1993 | Wang |

(Continued)

FOREIGN PATENT DOCUMENTS

JP   H10-91300   4/1998

(Continued)

OTHER PUBLICATIONS

Bernstein, Control Data Center Servers, Systems Management, pp. 99-101, Dell copyright (Oct. 2004).*

(Continued)

*Primary Examiner*—Alford W Kindred
*Assistant Examiner*—Ernest Unelus
(74) *Attorney, Agent, or Firm*—Davidson Berquist Jackson & Gowdey LLP

(57) ABSTRACT

A computer interface device includes circuitry enclosed in a housing; a first cable electrically connected to the circuitry and integral with the housing; a video port connection plug electrically connected to the circuitry via the first cable; a mouse port connection plug electrically connected to the circuitry via a path through the housing of the video port connection plug; and a keyboard connection plug electrically connected to the circuitry via a path through the housing of the video port connection plug.

42 Claims, 23 Drawing Sheets

U.S. PATENT DOCUMENTS

| | | | |
|---|---|---|---|
| 5,260,532 A | 11/1993 | Tinder et al. | |
| 5,272,525 A | 12/1993 | Borchardt et al. | |
| 5,353,409 A | 10/1994 | Asprey et al. | |
| 5,535,036 A | 7/1996 | Grant | |
| 5,573,425 A | 11/1996 | Morisawa et al. | |
| 5,637,013 A | 6/1997 | Weber | |
| 5,708,897 A | 1/1998 | Manabe et al. | |
| 5,742,718 A | 4/1998 | Harman et al. | |
| 5,744,754 A | 4/1998 | Strang et al. | |
| 5,775,939 A | 7/1998 | Brown | |
| 5,792,986 A | 8/1998 | Lee | |
| 5,850,209 A | 12/1998 | Lemke et al. | |
| 5,926,509 A | 7/1999 | Stewart et al. | |
| 5,929,386 A | 7/1999 | Hornick | |
| 6,112,264 A | 8/2000 | Beasley et al. | |
| 6,119,146 A * | 9/2000 | Heller et al. | 709/203 |
| 6,137,455 A * | 10/2000 | Duo | 345/520 |
| 6,150,997 A | 11/2000 | Asprey | |
| 6,185,643 B1 | 2/2001 | Kirshtein et al. | |
| 6,192,433 B1 | 2/2001 | Chan et al. | |
| 6,256,014 B1 | 7/2001 | Thomas et al. | |
| 6,304,895 B1 | 10/2001 | Schneider et al. | |
| 6,329,616 B1 | 12/2001 | Lee | |
| 6,343,080 B1 | 1/2002 | Kondo | |
| 6,345,323 B1 * | 2/2002 | Beasley et al. | 710/38 |
| 6,373,476 B1 * | 4/2002 | Dalgleish et al. | 345/204 |
| 6,378,014 B1 | 4/2002 | Shirley | |
| 6,449,866 B1 | 9/2002 | Murray | |
| 6,482,042 B1 | 11/2002 | Tupper | |
| 6,498,890 B1 * | 12/2002 | Kimminau | 385/134 |
| 6,521,836 B1 | 2/2003 | Simonazzi | |
| 6,580,044 B2 | 6/2003 | Ogawa et al. | |
| 6,601,124 B1 * | 7/2003 | Blair | 710/305 |
| 6,609,034 B1 * | 8/2003 | Behrens et al. | 700/19 |
| 6,623,295 B2 | 9/2003 | DeLadurantaye, III | |
| 6,633,934 B1 * | 10/2003 | Thornton | 710/100 |
| 6,633,935 B1 | 10/2003 | Chan et al. | |
| 6,671,756 B1 * | 12/2003 | Thomas et al. | 710/73 |
| 6,672,896 B1 * | 1/2004 | Li | 439/502 |
| 6,748,005 B1 * | 6/2004 | Riazi et al. | 375/133 |
| 6,886,055 B2 * | 4/2005 | Heller et al. | 710/62 |
| 6,983,340 B1 * | 1/2006 | Hermanson et al. | 710/301 |
| 7,043,748 B2 * | 5/2006 | Thornton et al. | 725/78 |
| 2001/0034157 A1 | 10/2001 | DeLadurantaye, III | |
| 2001/0044843 A1 * | 11/2001 | Bates et al. | 709/224 |
| 2001/0053627 A1 | 12/2001 | Armistead et al. | |
| 2002/0081907 A1 | 6/2002 | Olson et al. | |
| 2002/0143996 A1 | 10/2002 | Odryna et al. | |
| 2003/0123677 A1 | 7/2003 | Tran | |
| 2003/0188049 A1 | 10/2003 | Dickens | |
| 2004/0001323 A1 | 1/2004 | Chen | |
| 2004/0044822 A1 | 3/2004 | Chen | |
| 2004/0066790 A1 | 4/2004 | Valavi et al. | |

FOREIGN PATENT DOCUMENTS

| | | |
|---|---|---|
| JP | 2000-115591 | 4/2000 |
| WO | WO 00/17766 A2 | 3/2000 |
| WO | WO 01/84291 | 11/2001 |

OTHER PUBLICATIONS

Office Action mailed Apr. 18, 2007 in corresponding Japanese Patent Application No. 2003-524097, with translation (English).

Office Action issued Apr. 25, 2007 in Japanese patent application No. 2002-578172.

Kimara Andreas, "KWM Switch Solutions," Mar. 1, 2001, Network Technologies Inc., pp. 1-38.

Search Report and Written Opinion mailed Apr. 21, 2008 in International Application No. PCT/US2007/006845.

* cited by examiner

DIODE SWITCHED VIDEO CURRENT PATH ILLUSTRATION FOR TWO TRANSMITTERS ONE OF THREE VIDEO CHANNELS SHOWN

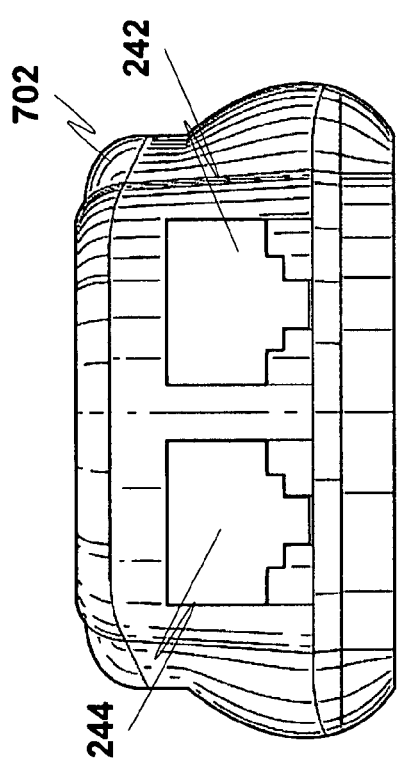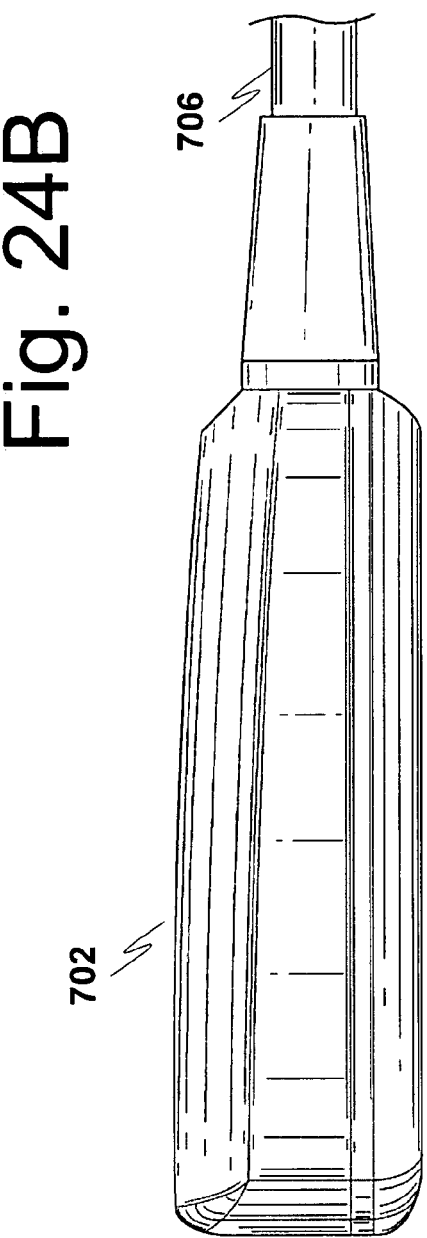
Fig. 24A
Fig. 24B

DEVICE FOR USE IN A SYSTEM FOR PROCESSING KEYBOARD, VIDEO AND MOUSE SIGNALS

CROSS-REFERENCES TO RELATED APPLICATIONS

This application is a continuation of U.S. patent application Ser. No. 09/951,774, filed Sep. 14, 2001 ("Passive Video Multiplexing Method and Apparatus"). Priority is claimed to Provisional Application Ser. No. 60/279,461, filed on Mar. 29, 2001, the contents of which are hereby incorporated herein by reference.

FIELD OF INVENTION

The present invention relates to a method of connecting to and performing user and administrative functions on remote computer systems. More specifically, it relates to a passive video multiplexing extension system and a method for network based access of those remote computers by users and administrators.

BACKGROUND AND SUMMARY OF THE INVENTION

In a typical computer network there are a number of client computers that are coupled via communication links to several network server resources. These resources include, for example, file servers, print servers, modem servers, and CD ROM servers. Each server is usually a stand-alone computer with its own keyboard, video, and mouse monitor (KVM). Each client computer utilizes the functions provided by the server computers through respective communication links.

In some computer applications, it is desirable to connect one or more users to one or more computers. It is also desirable at times to do so when users and computers are at different locations. For example, users increasingly desire to access information from several computers located at remote locations via a peripheral switch, such as a KVM switch. In such cases, a user could remain at one location and cause the peripheral switch to selectively attach to one of several computers. It is also possible to use peripheral switches to selectively connect several users to a plurality of remote computers.

Video signals produced by a remote computer are routinely transmitted through a KVM (keyboard, mouse, video) extender to a remote user. In one approach, in order to minimize the number of wires extending between a remote computer/server and the remote user location, horizontal and vertical sync signals as well as mode signals are encoded with the analog video signal.

In another approach, a dedicated communication channel is provided from a remote site to serve as a means for coupling to the peripheral switch. The dedicated communication channel could use the same propriety protocol language as the local peripherals for control and status functions. Security features may also be controlled from the remote site. In yet another approach, the method of providing a remote peripheral connection uses a local area network (LAN).

The KVM switches and extenders are known devices and are commercially available. Examples of these KVM switches are commercially marketed by Avocent Corporation of Huntsville, Ala. as the Autoview family of products and the XP family of products. Avocent Corporation also markets KVM switches under the names Outlook and ViewPoint. The KVM switch 12 provides a number of functions in the embodiment of FIG. 1. First, when servers 13 boot up, the KVM switch 12 emulates keyboard, video and mouse initiation commands such that each of the servers 13 believes that it is actually connected to a single keyboard, video and mouse workstation. The KVM switch is programmed to emulate keyboard, video and mouse initiation commands in accordance with one of any number of different KVM standards, such as Sun, PS2, etc. for keyboard/mouse, and VGA, SVGA, etc. for video. In addition, the KVM switch 12 polls the workstation requirements (such as the type of mouse, type of monitor, and type of keyboard) and provides data conversions that are necessary for otherwise inconsistent keyboard, video, and mouse devices to communicate with the servers 13.

With the introduction of large numbers of computers, the need for a network operator to access many thousands of computers becomes acute. Of course, KVM switches can be scaled in increasing numbers in order to accommodate the growing numbers of computers that must be attached to a few workstations, but the number of scaled KVM switches becomes a space consideration even in large server areas.

Still referring to FIG. 1, an exemplary KVM switch system is shown in FIG. 1 and generally indicated at 10. A plurality of servers 13 are connected to a KVM switch indicated at 12. A user at 11 is capable of controlling each of the servers 13 through KVM switch 12. The operation of the server and the communication protocol used by the switching system 10 are well-known and therefore will not be repeated here for the sake of clarity. It will be appreciated that many different protocols can be employed for the servers 13 to communicate with the switching system 10 and that many protocols will be developed in the future to increase efficiency of data travel on the network and encompassing by the servers 13. The present invention is not limited to any particular one.

FIGS. 2-5 show various prior approaches for eliminating bulky cabling. Specifically, FIG. 2 shows a rack level server access in the KVM switch environment. FIG. 3 illustrates an approach as indicated at 30 that eliminates bulky and cumbersome cabling in rack-type environments. Here, a KVM switch daisy chain approach is shown. This approach includes a plurality of racks such as for example, identified by numeral 33 into which an internal PCI switching card is inserted. Each PCI switching card is located in a respective rack 33. Each PCI card is further interlinked in a daisy chain fashion by a CAT5 cable to a remote user 31. Each rack 33 includes a server. The configuration shown in FIG. 3 is determined to be feasible to a distance of up to 110 meters. Also, since system 30 occupies a single PCI slot for each server disposed in rack 33, a failure with respect to one server in the rack disables access to some or all servers on the system. Furthermore, system 30 permits a single operator at a time to reach all the servers, and is further restrictive of expansion to an enterprise wide solution.

Referring now to FIG. 5 (which is a blowup of a portion of FIG. 4), there is shown another approach for eliminating cable clutter. The system shown at FIGS. 4 and 5, however, works with specific machines. The propriety cable shown in the figure only comes in certain lengths, and therefore the cable must be constructed to service any computer in the rack. As with the prior approaches, any signal failure disables access to some or all network servers. Furthermore, this approach facilitates only one operator at a time to reach the network servers.

Passive extension schemes used in prior systems fail to work in the context of keyboard (K) and mouse (M) information beyond a distance of approximately 20 ft. Beyond this distance, wire extensions for K and M signals become problematic due to, inadequate signal rise times caused by cable capacitance. Furthermore, passive cabling systems become bulky when individual wire connections are provided for every required connection.

Although it may be possible to install dedicated communication links to each server computer in order to allow a system administrator to operate the network from a central location, a large number of cables may be required for anything other than a very simple network. Thus, there is a need to overcome the problems encountered by prior systems.

Accordingly, a passive video multiplexing method and apparatus for encoding video synchronization signals within a KVM extension system is proposed to overcome the problems encountered by prior systems.

In the present invention, a Rack Interface Pod (RIP) is provided for receiving video signals from a server computer and providing them to a remote user via a local area network (LAN), preferably an Ethernet LAN. The analog signals received by the RIP are transmitted via Avocent Rack Interconnect (ARI) ports to the Rack Connection Manager (RCM) which includes video processing logic, a supervisory processor, a KVM switch system, and Ethernet interface circuitry. A plurality of ARI systems are connected to the RCM, and a plurality of network servers, intended to be controlled by the remote user, are connected to each ARI by a respective wiring strip or Pod Expansion Module (PEM). The remote user connected to the Ethernet LAN has the capability of selecting a particular network server among the plurality of network servers through the PEM. The remote user is also capable of selecting a particular network server that is directly connected to an ARI-port of the RCM. The circuitry located within the RCM (hereinafter "RCM processor" or "digitizing subsystem") digitizes the KVM signals from a selected network server and forwards the digitized signals to the remote user via the Ethernet LAN. Likewise, the remote users' K and M strokes are passed via the Ethernet LAN to the RCM processor which in-turn passes the signals to the selected network server via the ARI and PEM in the event the network server is connected to the PEM. Remote user's K & M strokes are passed via ARI ports to a network server that is directly connected to the ARI ports.

Each Rack Interface Pod (RIP) includes a processor which emulates K and M signals for a respective network server. Each RIP further provides a mechanism for switching which network server's video signals are passed through the PEM to the RCM. This method of switching video signals is performed by encoding differential R, G, B video signals from a respective network server around a common mode (CM) voltage. Specifically, the common mode voltages are raised or lowered in order to select the active video signal paths from a network server. Each (PEM) further includes a pair of switching diodes per differential video channel for each connection to a common switched differential video channel forming in essence a two pole multiple throw diode switching system. By providing both common mode and differential mode terminations at the receiving end of the bus, individual video channels may be turned on/off by varying the common mode voltages associated with the individual network servers, thus either forward biasing or reverse biasing the switching diodes associated with those channels. If a network server is not selected, then the video source of that particular server, to the PEM, is turned off in the RIP in order to eliminate any capacitive coupling through the reverse biased diodes in the (PEM) and to the RCM.

In the present invention, the Analog Long Interconnect ports provide access by a remote user via either a network based workstation or by direct peripheral attachment through the Analog Internet Protocol Video (IPV) module.

In the preferred embodiment of the present invention, any number of users can communicate on the Ethernet LAN, and any number of servers can be accessed by any of the users. The preferred embodiment provides unlimited scalability while allowing each user to gain console access to any of the associated servers.

In one aspect, the present invention proposes a keyboard, video, mouse (KVM) server management system, comprising a plurality of network interfaces having network ports communicating KVM signals to a plurality of remote user workstations. The remote user workstations are conversely coupled to the network and communicate keyboard and mouse (K, M) signals to a plurality of serves via their corresponding network ports. The KVM server management system further includes a switch for communicating KVM signals between the remote user workstations and a select network server from among the plurality of network servers.

In another aspect, the present invention provides method of switching video signals in a keyboard; video, mouse (KVM) server management system, the method including differentially encoding a plurality of video signal channel from a plurality of network severs around a plurality of common mode voltages; incorporating a pair of diodes in each video signal channels each pair of diodes connecting to a common differential channel and controlled to switch among the plurality of video signal channels; and selecting a video signal from a select network server from among the plurality of network servers.

In another aspect, the present invention provides a method of encoding video synchronization signals $H_{sync}$, $V_{sync}$ within a keyboard, video, mouse (KVM) extension system, the method including encoding R, G, B video signals differentially around their respective common mode voltage signals, the common mode signals representing encoded functions of combinations of the video synchronization signals; and differentially driving R, G, B video signals so as to allow removal of their respective common mode signals, such that (i) the net of alternating current produced by each of the differential video signals is zero; (ii) the net alternating current produced by encoded synchronization signals is zero.

In yet another aspect, the present invention provides a method of encoding video synchronization signals within a keyboard, video, mouse (KVM) server management system, the method including the steps of providing a plurality of interface ports for receiving KVM signals from a plurality of servers, each interface port including a differential video channel; providing a pair of switching diodes for each differential video channel; multiplexing different video channels down to common differential channels; encoding, R, G, B video signals around their respective common mode signals for each differential channel; differentially driving R, G, B video signals and their respective common mode signals, the common mode signals representing functions of video synchronization signals $H_{sync}$ and $V_{sync}$ respectively; switching individual differential video channels by varying common mode voltages of respective individual differential channels, and forward biasing or reverse biasing the switching diodes for enabling or disabling a respective differential channel; and providing both common mode and differential mode terminations at a receiving end of the R, G, B video signals so as to remove common mode signals from the video signals and extract original video synchronization signals.

In another embodiment, the present invention relates to a KVM server management system having a network interface unit, at least one switch to convert native KVM signals from a server into an intermediate format for transmission over corresponding lines, at least one switch communicatively coupled to a least one interface port for communicating K and M signals between a select server among a plurality of servers coupled to the switch via corresponding lines. Each line comprising a plurality of wires, and each wire including a single diode, wherein R, G, B signals are encoded around their respective common mode voltage signals using a sync-on-green encoding on one of the color components in order to select a server among a plurality of servers.

Lastly, the present invention provides a method of interfacing to KVM signals as provided by an Analog Long Interconnect, (ALI), an extended distance version of the KVM channel interface with differentially driven R, G, B video with video synchronization encoded on the respective common mode signals and providing corrective frequency compensation for the transmission losses encountered by the R, G, B channels in the extended cabling, as described in prior art, and provides for multiplexing between a plurality of these extensions an interfacing and through a network interface to a remote user.

BRIEF DESCRIPTION OF THE DRAWINGS

FIGS. 24A-24B illustrate a Rack Interface Pod (RIP) device according to embodiments of the present invention.

DETAILED DESCRIPTION OF THE INVENTION

Figure 12:
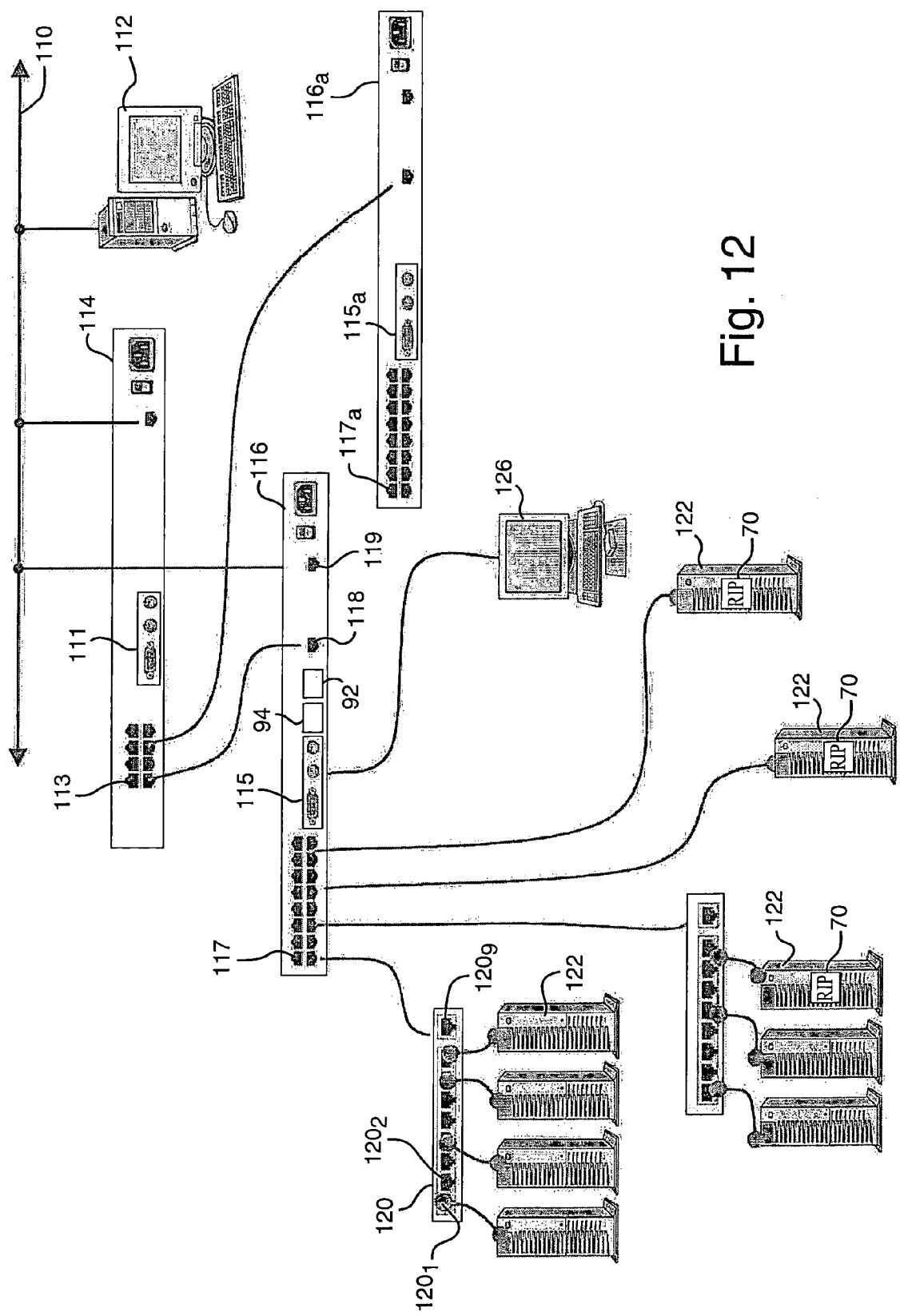
FIG. 12 illustrates a sample configuration of the passive video multiplexing and extension system in accordance with an example embodiment of the present invention.

Referring now to FIG. 12, there is shown a schematic representation of the passive video multiplexing and extension system of the present invention. System 100 includes a corporate LAN 110 to which a remote user 112 is communicatively coupled. In the preferred embodiment, the corporate LAN could be a wide area network (WAN), a packet switching network, such as for example, the Internet, or any other network type. The present invention provides two paths by which the remote user 112 may communicate via LAN 110 to a server 122. One path is via the LAN 110, the Internet Protocol Video (IPV) module 114 to the RCM 116 and then to the server 122. In one embodiment, network servers 122 may be directly connected to RCM 116. In another embodiment, network servers 122 are connected through PEM 120. The second path is directly from the LAN 110 to RCM 116 and then to the server 122.

Figure 16:
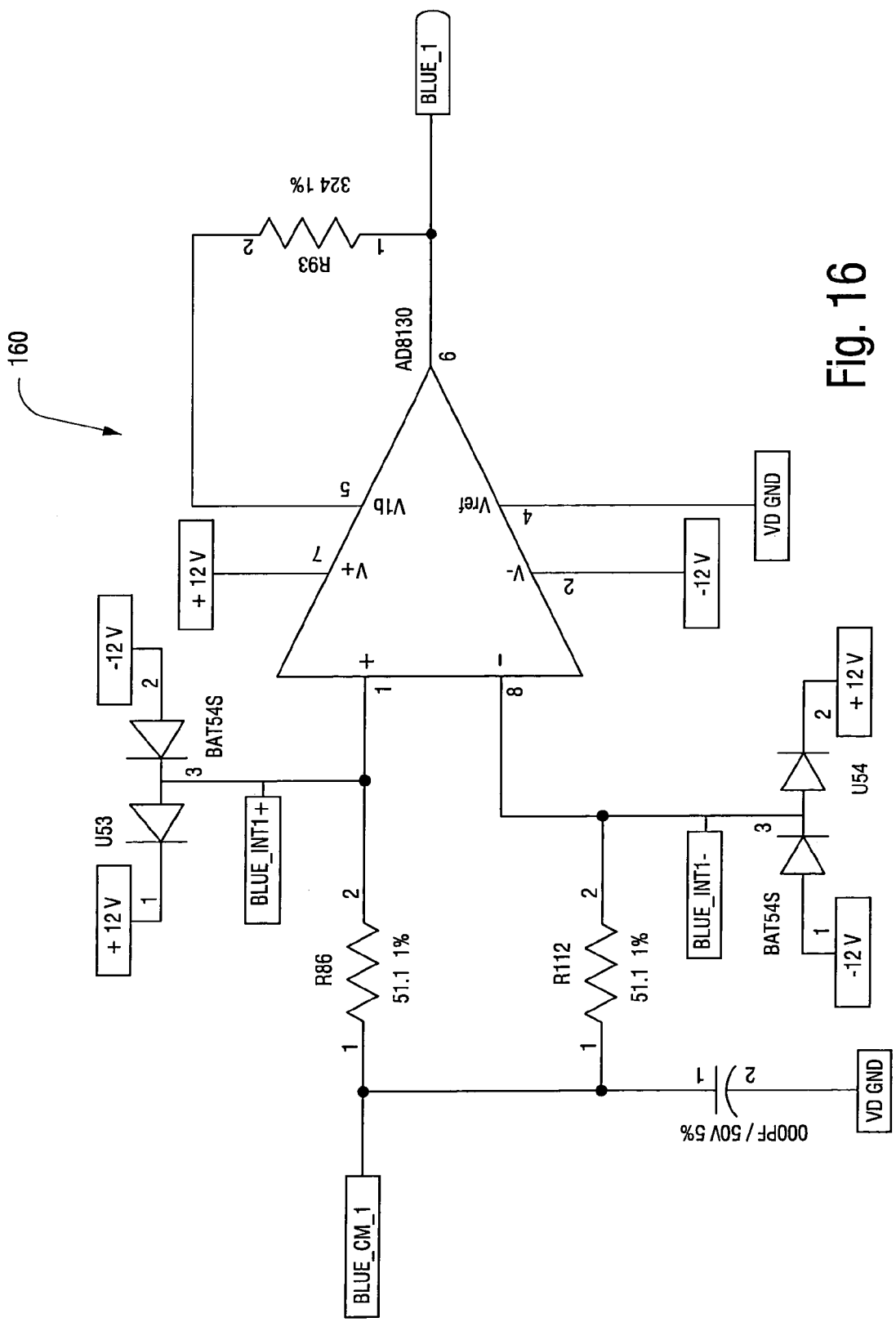
FIG. 16 illustrates an exemplary receiver circuit for a single channel in accordance with an example embodiment of the present invention.

When the communication is via the Internet Protocol Video (IPV) module 114, keyboard and mouse (KM) signals generated by the remote user 112 are received in the IPV module 114. A single IPV module and a single remote user are shown for the sake of brevity, although greater numbers are also envisioned within the invention. IPV module 114 further includes a plurality of input ports 113 and a KVM local access port 111. Each input port of the IPV module 114 may be connected to, a Rack Connection Manager (RCM) 116 or to an Avocent Longline Interconnect ALI) transmitter (not shown). The RCM 116 includes video receiver circuitry as shown in FIG. 16. In the exemplary embodiment of FIG. 12, only two RCMs 116, 116a are shown to be connected to IPV 114. In fact, each IPV is capable of providing connections up to a total of eight RCMs.

Figure 15:
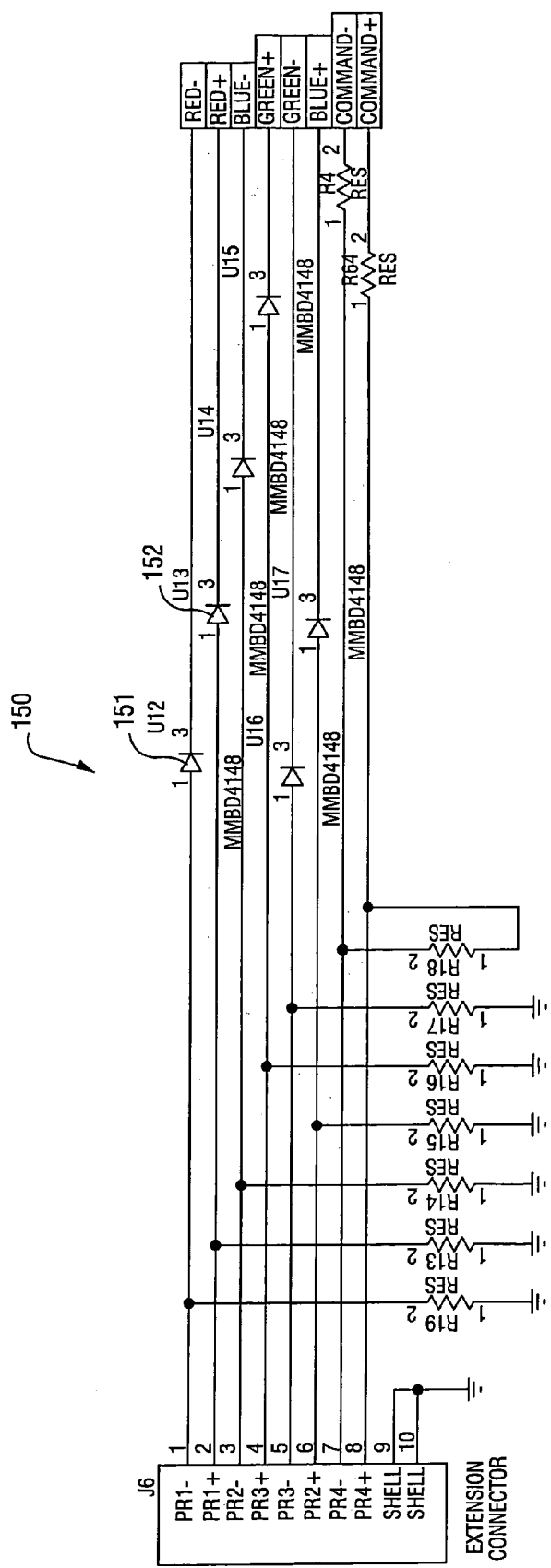
FIG. 15 illustrates an exemplary wiring circuit which includes diode differential pairs, the wiring circuit being located in the PEM and associated with a respective part of the wiring strip in accordance with an example embodiment of the present invention.

Each RCM 116 includes a KVM local access port 115, an Avocent Long Interconnect (ALI) port 118, a LAN port 119, and a plurality of input ports 117. Each input port 117 is capable of connecting to a PEM 120, or to a server 122. A plurality of network servers 122 may be connected to respective ports of the PEM wiring strip 120. Each port of the wiring strip 120 includes switching circuitry 150 having a plurality of pairs of differential diodes 151, 152 as shown in FIG. 15. In the exemplary embodiment of FIG. 12, each wiring strip 120 is shown to include 9 ports (1201-1209). Signals from ports 1201-1208 are combined in port 1209 and forwarded to receiver circuitry (FIG. 16) incorporated within RCM 116.

Figure 1:
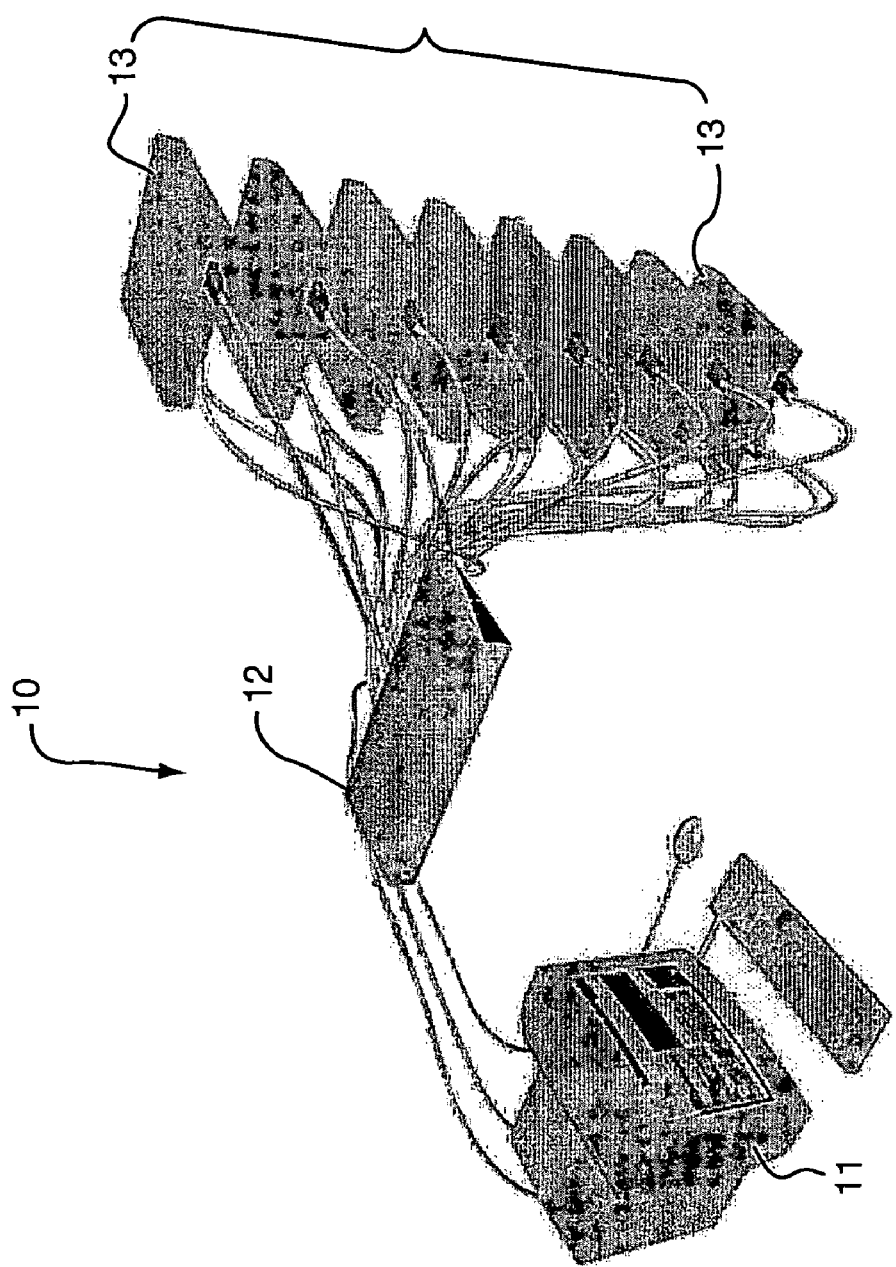
FIGS. 1-5 illustrate prior approaches of interconnecting a remote user to a plurality of network servers.
Figure 2:
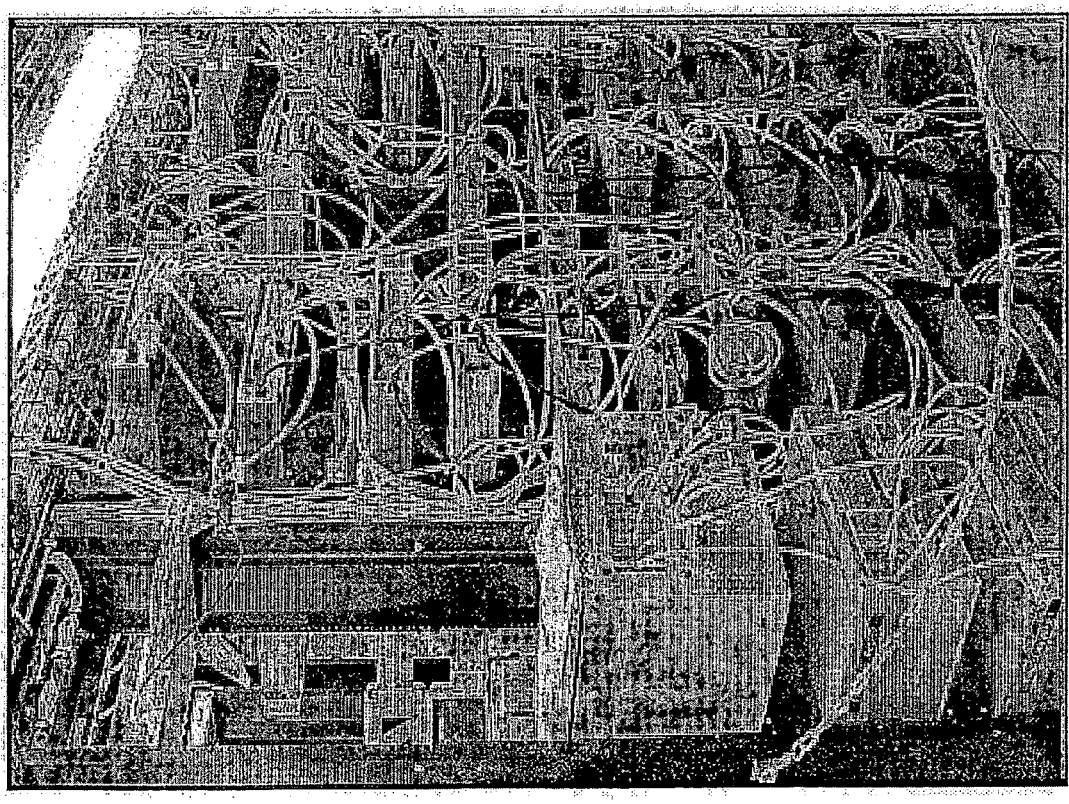
Figure 3:
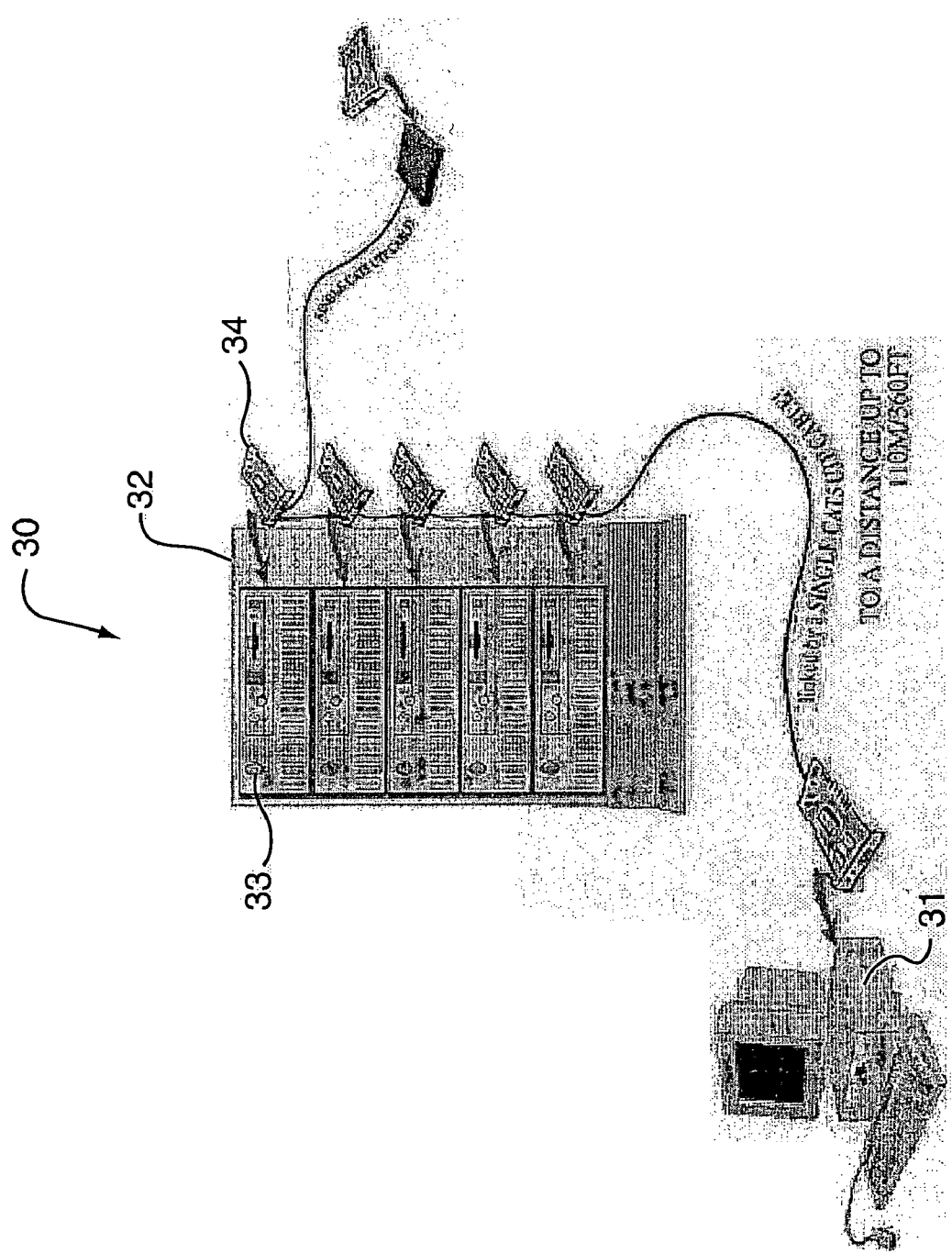
Figure 4:
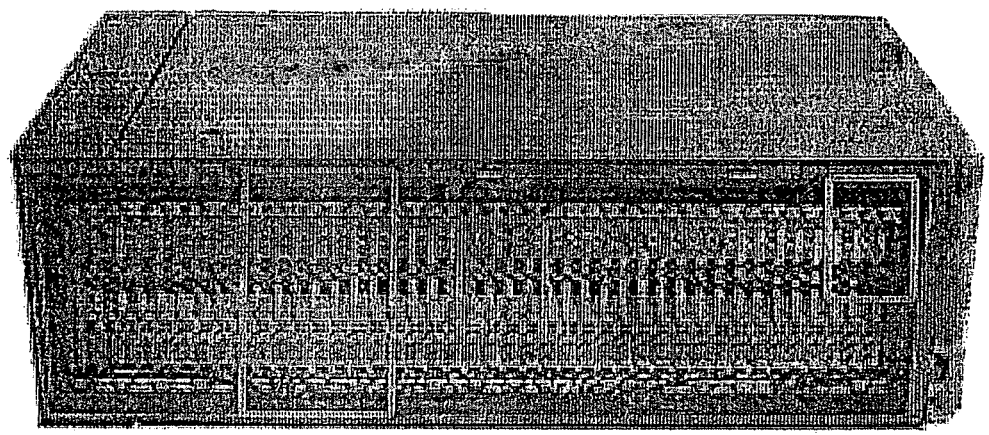
Figure 5:
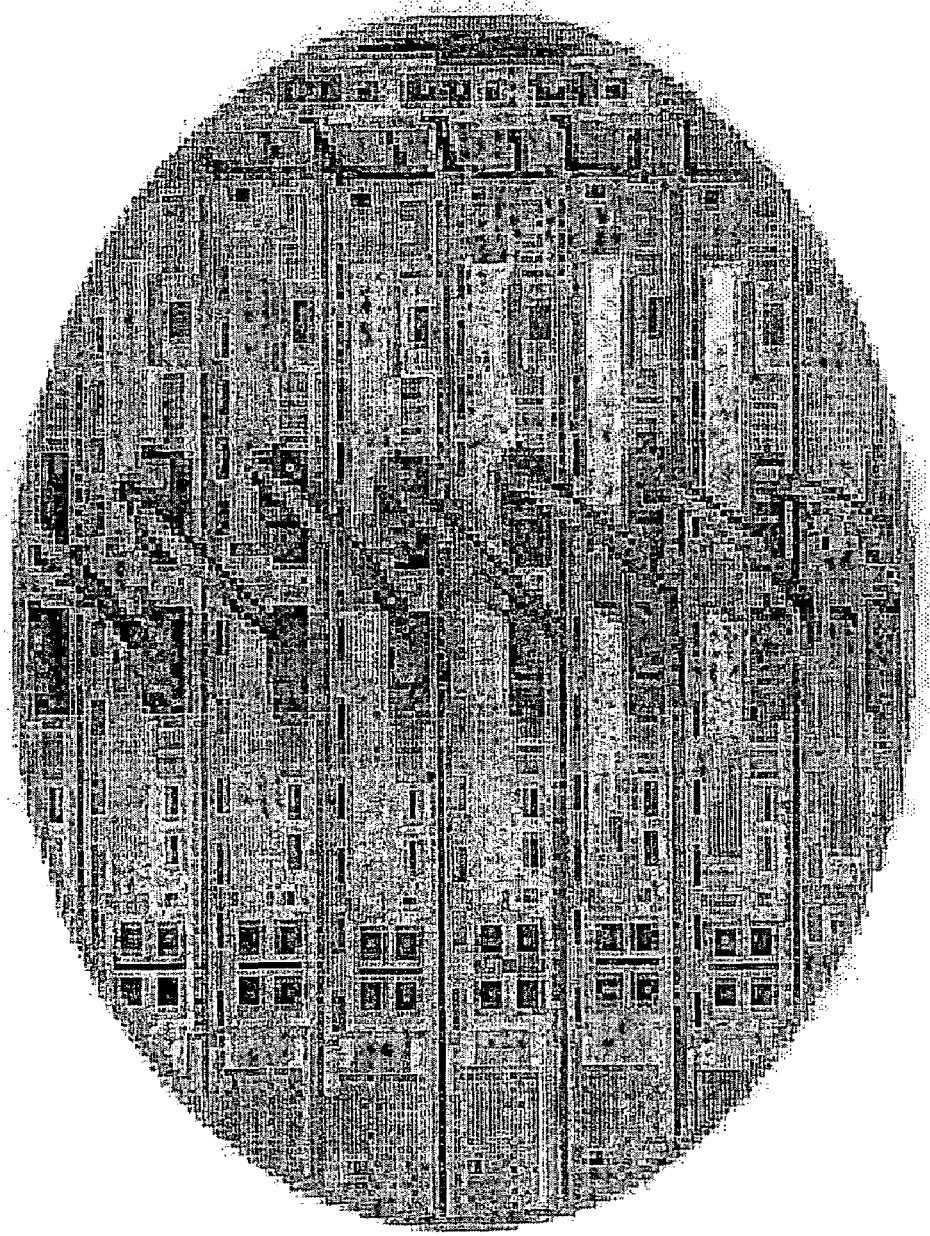
Figure 7:
FIGS. 7 and 7B illustrate an exemplary Rack Interface Pod (RIP), device for making external connections to a network according to an example embodiment of the present invention.
Figure 8:
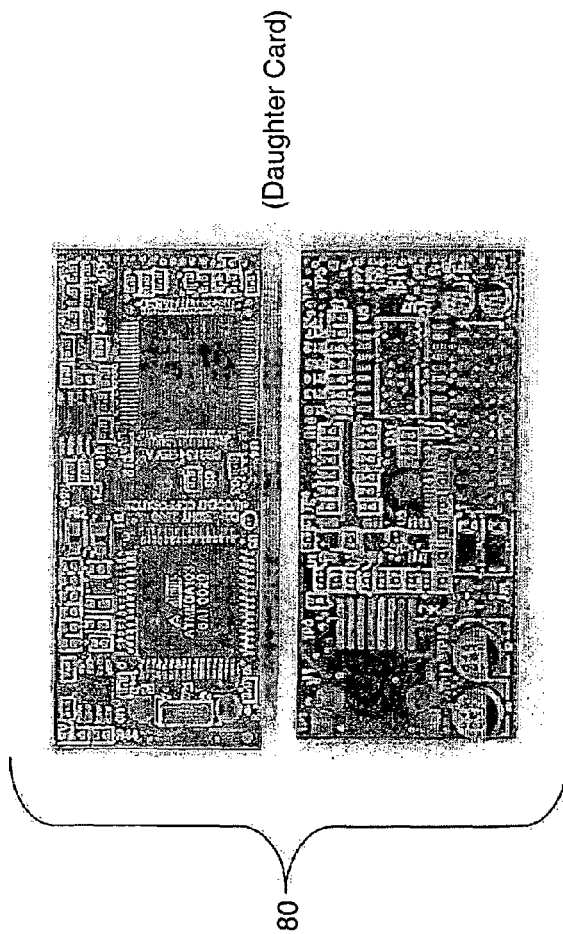
FIG. 8 illustrates a circuit board view of the RIP according to an example embodiment of the present invention.
Figure 13:
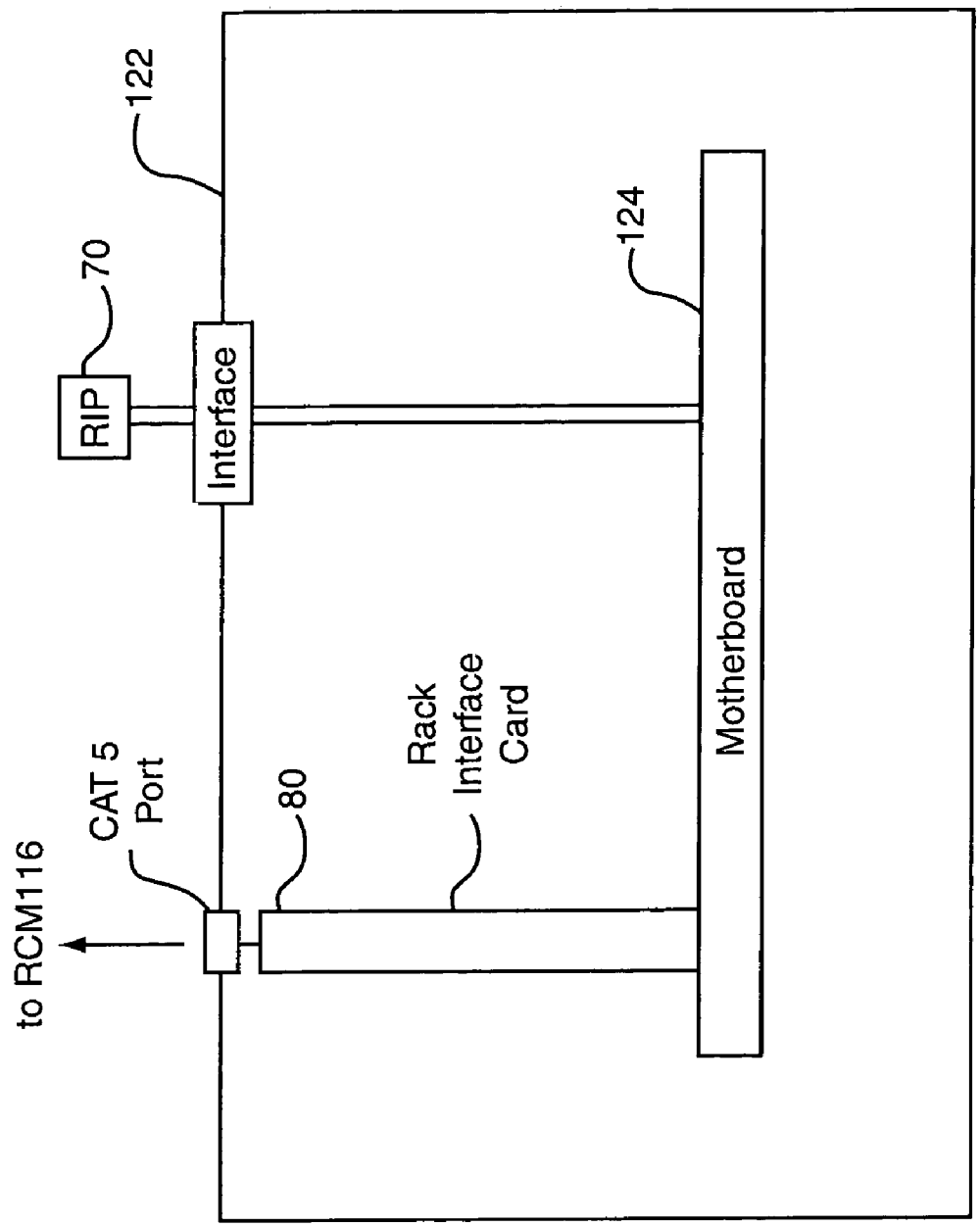
FIG. 13 is a schematic block diagram of an example server in accordance with an example embodiment of the present invention.

Referring to FIG. 13, each of the network servers 122 include a Rack Interconnect Card (RIC) interface card 90, referred to herein as RIC/daughter card as shown in FIG. 8. Each network server 122 may also include RIP 70 (FIG. 7) for receiving video signals from a network server 122 and communicating the video signals to a remote user via a local area network (LAN), preferably an Ethernet LAN. Details of circuitry within a RIP are illustrated with respect to FIG. 14 herein. The RIC 90 includes transmitter circuitry (FIG. 18) for transmitting KVM video signals to remote user 112. For example, visualizing from a high level perspective, the system for communicating information from a remote user 112 to a network server 122 includes an IPV module 114 which connects to LAN 110 to receive signals from the remote user 112. RCM 116 connects to IPV 114, wiring strips 120 connect RCM 116, and a plurality of network servers which connect to respective wiring strips 120. IPV 114, RCM 116, and wiring strips 120 act as intermediaries to the remote user 112 and the network servers 122.

In operation, IPV 114 receives KM signals from the remote user 112 via LAN 110 and KVM signals via the Avocent Longline Interconnect (ALI) 113 from the RCM 116. ALI, KVM signals received by the IPV 114 have been processed in RCM 116 by a processor located in the RCM (hereinafter "RCM processor") (92). The remote user 112 is capable of selecting a specific network server among a plurality of network servers 122 via the plurality of wiring strips 120 connected to the plurality of RCM input ports 117. The RCM processor 92 selectively processes video signals transmitted from a network server 122 and forwards the signals to the remote user 112 via the ALI port 118 and the IPV 114 and LAN 110. Likewise, the remote user's K and M strokes are passed via LAN 110 to the IPV 114, then via the ALI 118 to the RCM 116 processor which in turn processes the signals to forwards them to a respective network server 122 plugged into the wiring strip 120. The RIC 90 located in each network server 122 emulates K and M signals for a respective network server. The RIC 90 further has capability to switch video signals by encoding R, G, B signals from a respective network server 122 around a common mode voltage. The common mode voltage is raised or lowered to select a video signal from a network server 122.

In another embodiment, communications between user 112 and a server 122 are performed via LAN 110 and the RCM 116 bypassing AVI 114. The operation of the present invention, however, is analogous to the operation of embodiment having AVI 114.

The present invention is equally operable performed by integrating a RIC into server 122 or by connection of a RIP externally to KVM connectors of the server 122 as described above.

Figure 9:
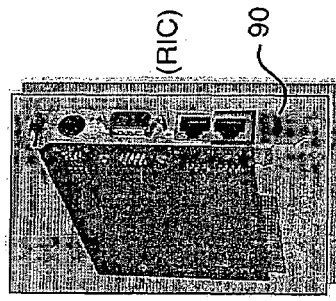
FIG. 9 illustrates a side view of a RIC (Rack Interconnect) PCI card used for gaining access to a network server power control and maintenance features according to an example embodiment of the present invention.

The common mode signal method for activating video-on and video-off signal is an extension of the H and V sync coding methodology. Various schematics are described below to show how the system as shown in FIG. 12 operates. The RCM includes a processor 92 which detects and digitizes (KVM signals) from the various servers (each having RIC/RIPs as shown in FIGS. 7-9) selected through the wiring strip 120. Switches present in the RCM 116 select which video signals from among the plurality of RIC/RIP and PEM signals connected to the AI inputs 117 to digitize and pass through the Ethernet LAN 110 to the remote user 112. Likewise, the remote user's K, M strokes are passed via the Ethernet LAN 110 to RCM processor 92 which passes the signals to a server 122 that is plugged into the wiring strip 120. RCM processor 92 may also communicate K, M stokes directly to a server 12 without going through wiring strip 120. The RIC/RIP 90,70 respectively emulate the K and M signals for a respective server to which they are interfaced. The RIC/RIP 90, 70, respectively, further provide a mechanism for switching which server's video is passed through the wiring strip to the RCM. This is done by raising or lowering the common mode (CM) voltage on the video. If a particular server is not selected that particular server turns OFF video information portion of it's video source by forward coupling to the RCM so that no interference is induced due to parasitic capacitive coupling present in the wiring strip (PEM) 120, thus eliminates video noise.

As noted above, a network server RIP may be directly connected to an RCM system AI input. The purpose of connecting a server on it's own to RCM input is based upon, for example, importance of the individual server, requirements for blocking or not blocking access to the connected servers, and the degree of accessibility desired to a particular server as determined by a user.

The wiring strip defines a short haul intra/inter rack single Category 5 (CAT5) cable KVM connection interface. This interface is implemented on the four Category 5 (CAT5) wire pairs, as follows:

Red Out+
Red Out−
Green Out+
Green Out−
Blue Out+
Blue Out−
Command+
Return

The Command wire is a half-duplex, multi-drop, asynchronous data connection between the RCM and the RICs/RIPs. This connection is used to control the active RIP or RIC on a given RCM AI port and to pass keyboard (K) and mouse (M) information between the RCM and the active RIP. Additionally, this path supports the upgrading of RIP software.

Figure 6:
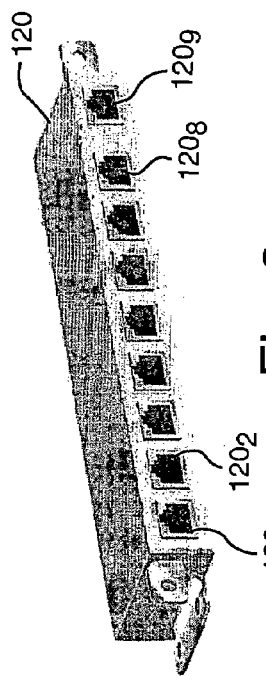
FIG. 6 illustrates an exemplary POD Expansion Module (PEM) (wiring strip) in accordance with an example embodiment of the present invention.

Referring now to FIG. 6, there is shown a rack interconnect system/wiring strip 120 according to the present invention. This system 120 may be expanded to provide connectivity to virtually unlimited number of computers inside a single rack. This system, further provides a single CAT5 interconnection for an analog KVM. Wiring strip 120 includes 8 rack interconnect inputs 1201-1208, and an output 1209. The wiring strip 120 is capable of interfacing with a KVM switch, a server, and another wiring strip.

Figure 10:
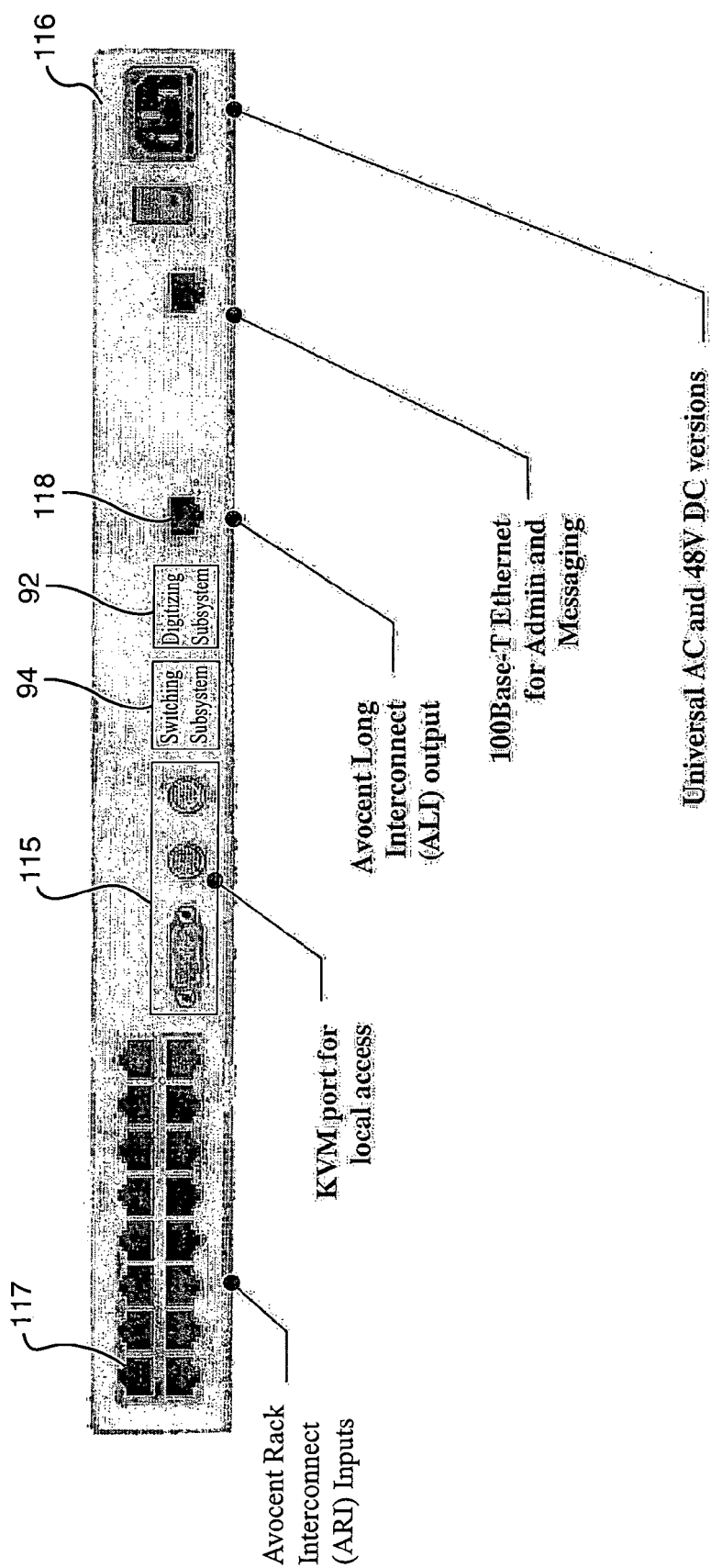
FIG. 10 illustrates a back view of a Rack Connection Manager (RCM) according to an example embodiment of the present invention.
Figure 10A:
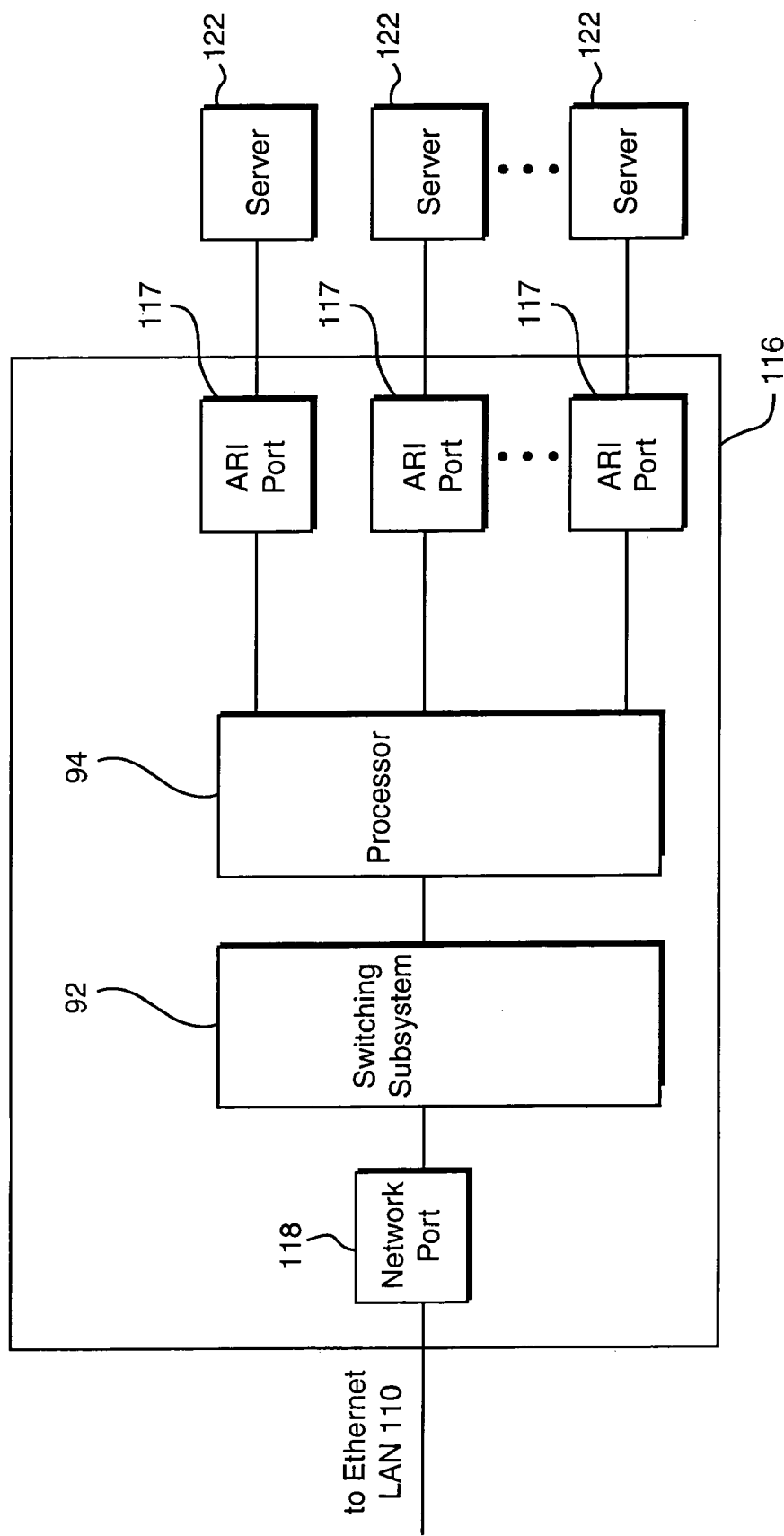
FIG. 10A illustrates a detailed exemplary view of the RCM as identified in FIG. 10.

Referring now to FIG. 10, there is shown an exemplary rack connection manager (RCM) 116 as in FIG. 12 having a plurality of interconnect inputs 117, a KVM port 115 for local access, an ALI port 118, and a 100 base-T Ethernet LAN port 119. Port 119 may be used by remote user 112 for either server console access to servers 122 or communicating administrative and maintenance information to the RCM, or for updating RCM and RIC/RIP software. As noted above, the RCM 116 includes RCM processor 92 and a matrix switch/switching subsystem 94. The RCM 116 provides access to multiple simultaneous users via LAN 110 without interference. A wiring strip 120 (FIG. 6) and the network server 122 via RICs and RIPs (FIG. 13) may be connected to ARI inputs 117 of the RCM 116 in any combinations. The RCM 116 further includes receiver circuitry 160 which accepts signals from ARI inputs 117, the details of which are discussed with respect to FIG. 16. FIG. 10A shows an exploded view of the RCM as identified in FIG. 10.

Figure 11:
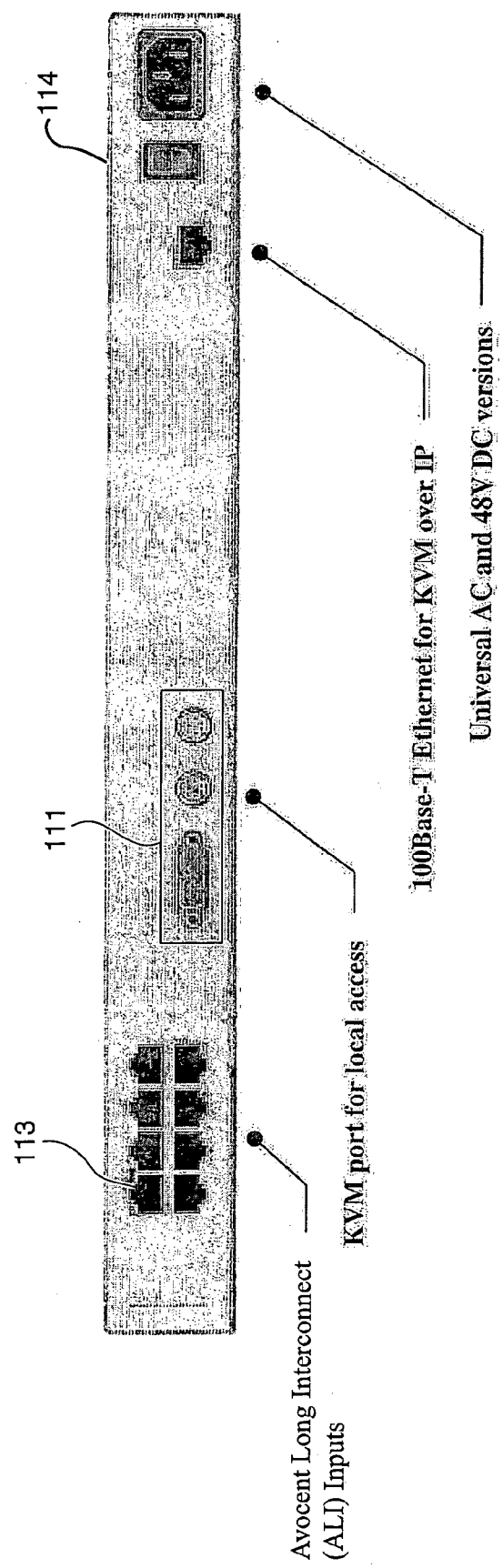
FIG. 11 illustrates a back view of an analog IP video module according to an example embodiment of the present invention.

Referring now to FIG. 11, there is shown an exemplary analog IP video (IPV) module 114. The IPV module provides access to multiple users without interference between users. The IPV module includes one local KVM output port 111 comprising VGA and PS-2 keyboard and mouse connections. It also supports multiple simultaneous digital KVM-over-IP connections via ports 113. IPV module 114 further provides a single LAN IP connection to all of its inputs, supporting such actions as, for example, network server 122 selection, server 122 console operations and IPV configuration and administrative functions. IPV module 114 further provides skew compensation to ALI input signals for UTP runs of up to 300 meters.

Referring now to FIG. 13, there is shown an exemplary schematic block diagram of a server 122 in accordance with the present invention. Each server 122 shown in FIG. 12 includes a motherboard 124, and a RIC 90. Other components, not shown for the purposes of brevity, may also be present in the server 122. The server 122 can be a standard PC with a Rack Interconnect PCI card allowing the server 122 to communicate to a remote user 112 via an RCM and network 110. The network 1110 can be a LAN or other network and can follow the Ethernet, IP/TCPIP or other data protocol without any protocol restrictions. The server 122 receives keyboard and mouse instructions from a keyboard and mouse emulation performed in the RIC and connected to its keyboard and mouse ports at the motherboard 124. Further, video and keyboard and mouse signals from the motherboard 124 are passed via the RIC 90 to the RCM 116.

FIGS. 7-9 show various alternate embodiments for obtaining access to a server console interfaces. FIG. 7 illustrates a rack interface pod (RIP) for providing external connection to a server. FIG. 8 shows a daughter, card designed to directly mount on a motherboard of a server. The daughter card provides full integration with the motherboard maintenance signals available within the server system. FIG. 9 shows a Rack Interconnect PCI card embodiment which also is capable of providing access to a server power control and other maintenance features.

Figure 7B:
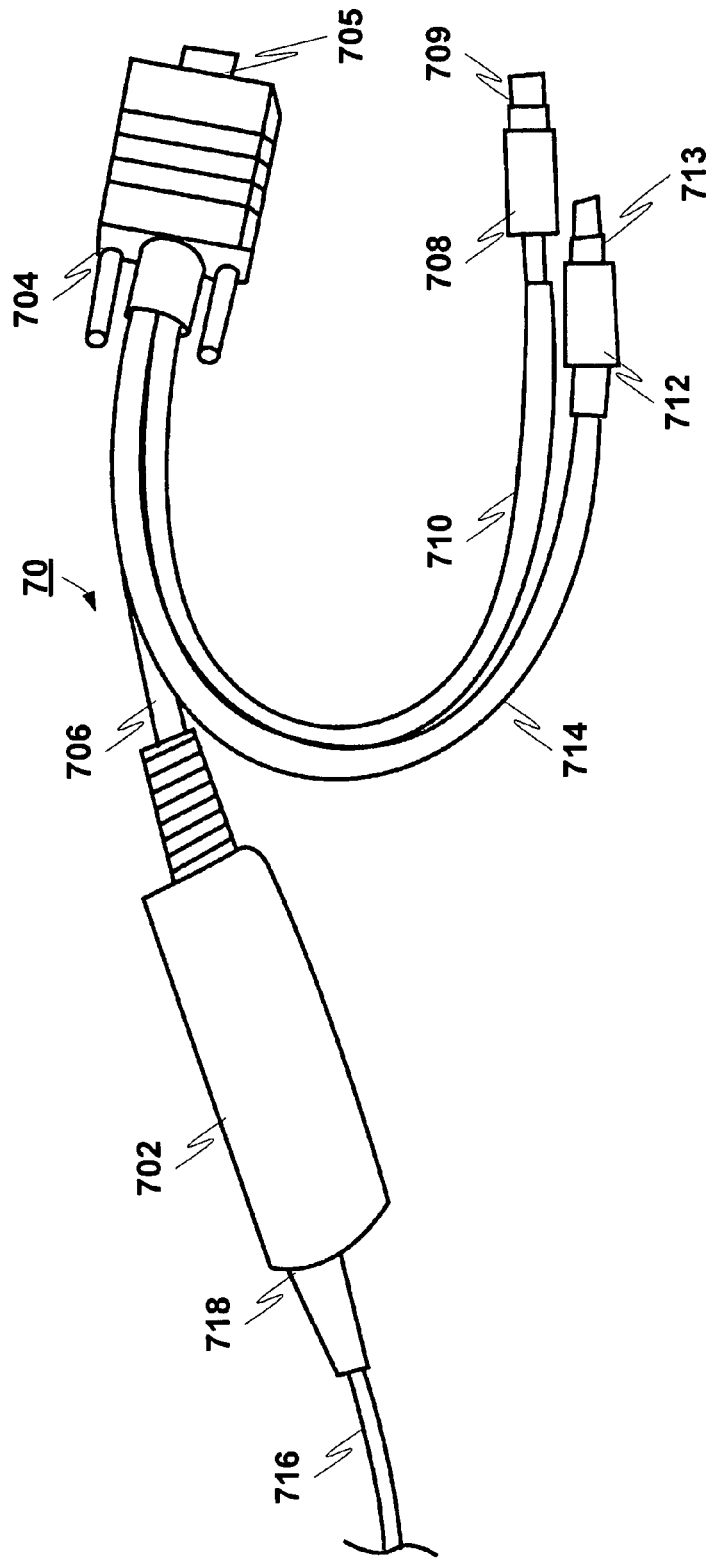

As shown in FIG. 7, a device 70 (a RIP) includes a main body with a lump-in-cable design. A video port connector, including, e.g., a VGA-type video port connection plug, is constructed and adapted to connect to a video port of a computer. A first cable has one end integrally connected to said main body, and has its other end connected to a housing of the video port connector. A mouse port connector is constructed and adapted to connect to a mouse port of a computer. The mouse port connector has a mouse port connection plug. A second cable has one end connected to the housing of said video port connector and has its other end connected to the mouse port connector. A keyboard port connector is constructed and adapted to connect to a keyboard port of a computer. The keyboard port connector has a keyboard port connection plug. A third cable has one end connected to the housing of the video connector and has its other end connected to the keyboard port connector. As shown in FIG. 7B, a device 700 (a RIP) includes a main body 702 with a lump-in-cable design. A video port connector 704 is constructed and adapted to connect to a video port of a computer. The video port connector may include a VGA-type video port connection plug 705. A first cable 706 has one end integrally connected to said main body 702, and has its other end connected to a housing of the video port connector 704. A mouse port connector 708 is constructed and adapted to connect to a mouse port of a computer. The mouse port connector 708 has a mouse port connection plug 709. A second cable 710 has one end connected to the housing of said video port connector 704 and has its other end connected to the mouse port connector 708. A keyboard port connector 712 is constructed and adapted to connect to a keyboard port of a computer. The keyboard port connector 712 has a keyboard port connection plug 713. A third cable 714 has one end connected to the housing of the video connector 704 and has its other end connected to the keyboard port connector 712.

Figure 14:
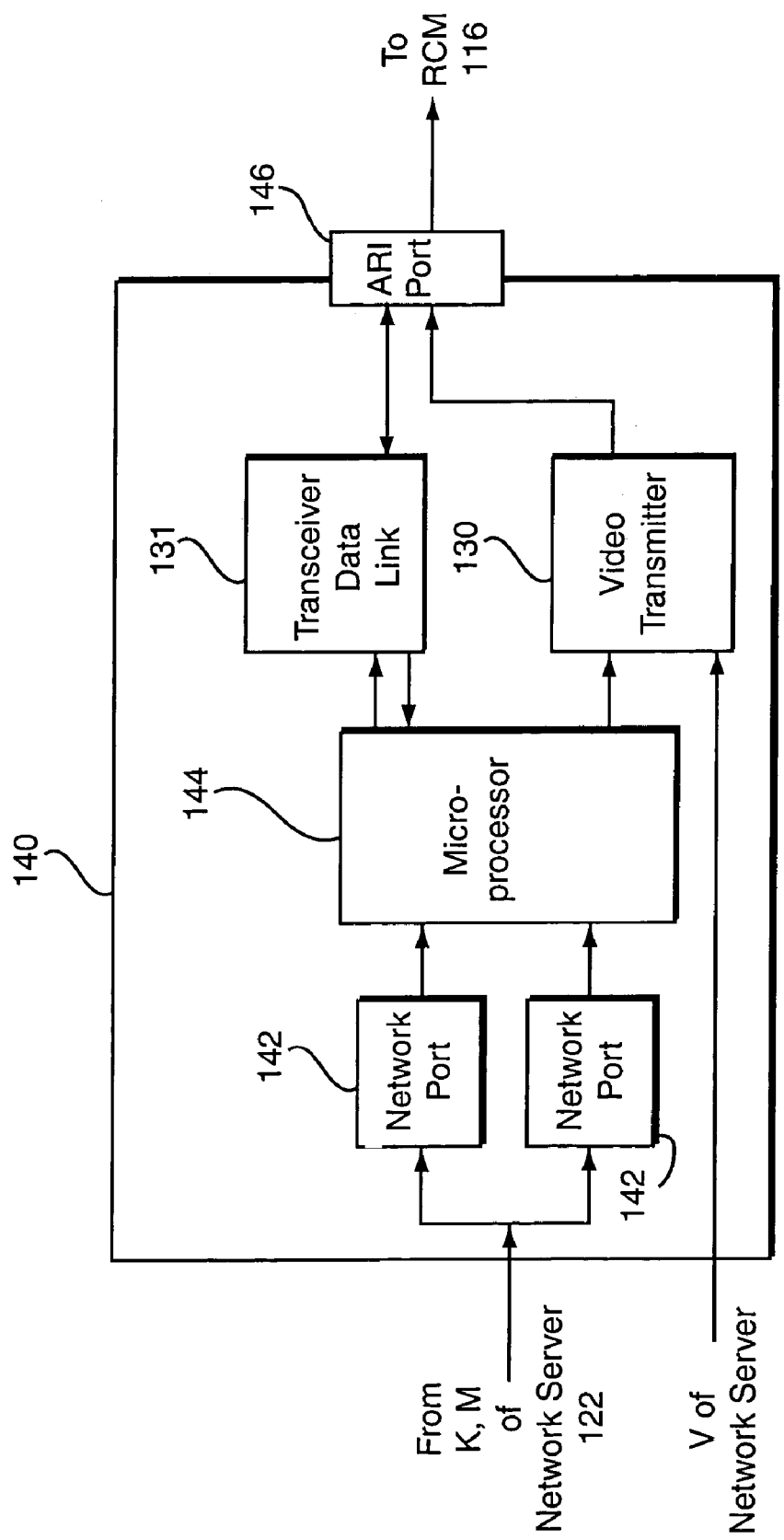
FIG. 14 illustrates a block diagram of a RIP circuitry in accordance with an example embodiment of the present invention.
Figure 20:
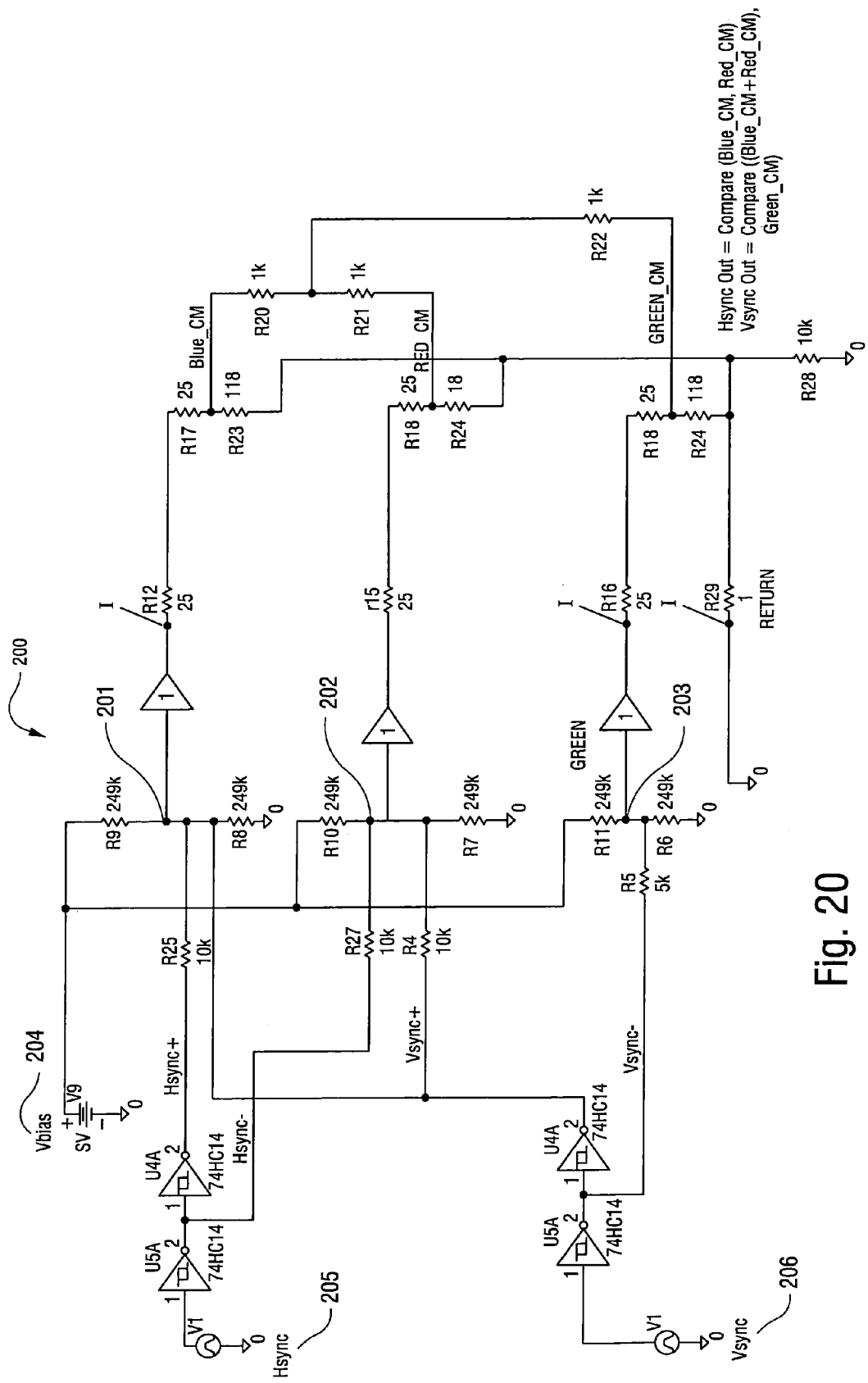
FIG. 20 illustrates a RIC common mode current path having video synchronization signals encoded in a quasi-differential manner in accordance with an example embodiment of the present invention.

A pod device may include the following features:
"Lump in the cable" design
Captive molded cables
   VGA and PS-2
   VGA and USB
Contains Keep-alive
DDC2B compliant
Two CAT5 connections
   Input from upstream computer
   Output to downstream computer or Rack Chain Manager (RCM)
Chain is back powered from the RCM
Keep alive is powered from the computer keyboard power A pod device may include the following features:
"Lump in the cable" design
Captive molded cables
   VGA and PS-2
   VGA and USB
Contains Keep-alive
   Powered from the computer keyboard connector
DDC2B compliant
Single CAT5 ARI output
   a Meant for local connection to an RCM FIG. 14 shows a schematic 140 of various subsystems, present within a RIP 70. Schematic 140 includes a plurality of interface ports for receiving Video (V), keyboard (K) and mouse (M) signals from a respective network server 122, a microprocessor 144, datalink transceiver subsystem 131, and transmitter circuitry 130 all located in the RIP 70. Processor 144 controls switching functions in order to combine $V_{bias}$, $H_{sync}$ and $V_{sync}$ signals 204, 205, 206, respectively to generate common mode signals as illustrated in FIG. 20.

Referring to FIG. 15, there is shown an exemplary switching circuitry 150 having a plurality of diodes 151, 152 per differential pair for each connection to a common differential pair switched wire bus. Switching circuitry 150 is located in each port of the wiring strip 120, the details of which are set forth above with respect to FIG. 12. By providing both common mode and differential mode terminations at the receiving end of the bus, individual diode connections are turned on/off by varying the common mode voltages associated with a network server 122. In this fashion, the video from network servers 122 are switched without active switching elements rather the common voltage is raised or lowered in order to select a video signal from a network server 122.

In another embodiment, for single ended pairs, a composite sync-on-green encoding technique is used for sync processing wherein H and V sync signals are combined into a composite sync signal. The composite sync signals is further combined with a green video channel. This encoding technique is used to select a network server 122 among a plurality of network servers. For the sake of brevity, the details of sync-on-green encoding technique are not set forth herein.

Figure 17:
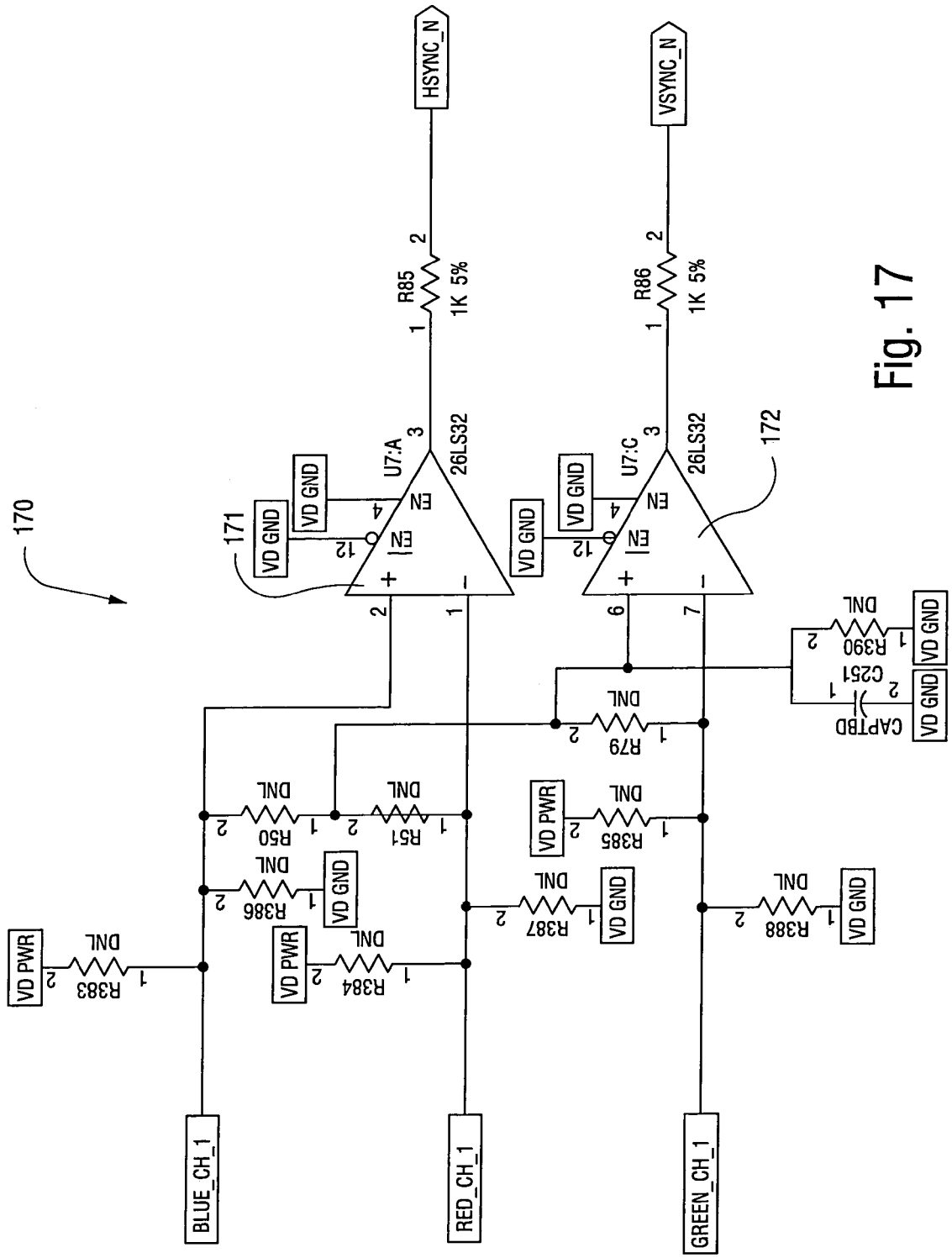
FIG. 17 illustrates an exemplary circuit for decoding $H_{sync}$ and $V_{sync}$ signals from common mode signals according to an example embodiment of the present invention.
Figure 18:
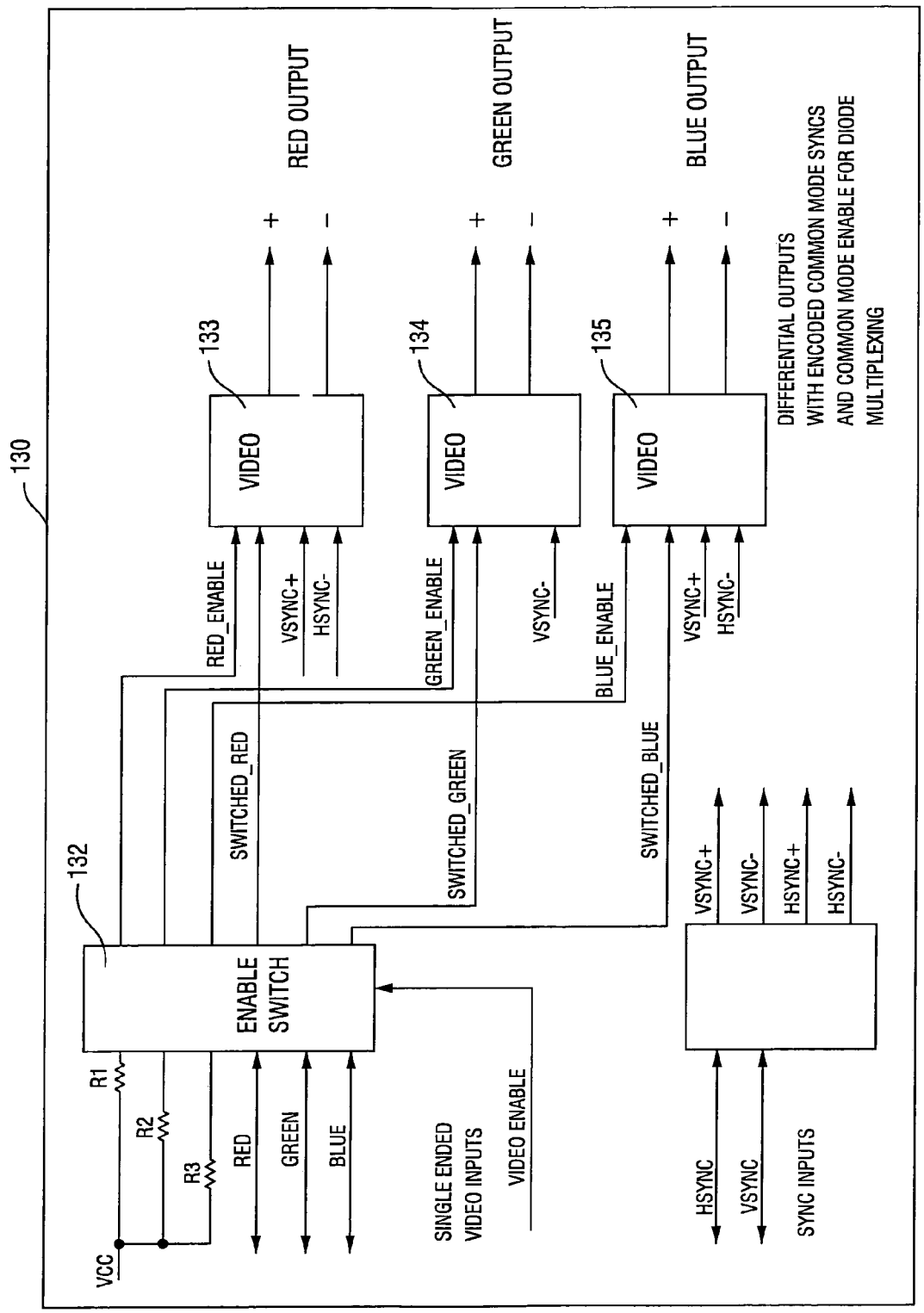
FIG. 18 illustrates a Rack Interconnect Channel (RIC) video transmitter circuitry in accordance with an example embodiment of the present invention.

Referring now to FIG. 16, there is shown an exemplary receiver circuit 160 located in RCM 116 (FIG. 12). The receiver circuit is shown to include a single color component channel for the sake of clarity. It will be understood that each of the R, G, B channels include each such receiver circuit in each RCM 116. FIG. 17 discloses the details of a circuit for implementing a decoder for the $H_{sync}$ and $V_{sync}$ signals that are combined with common mode signals in order to produce differential outputs with encoded common mode sync signals for diode multiplexing purposes as shown in FIG. 18. Differential receivers 171, 172 are used to decode the $H_{sync}$ and $V_{sync}$ signals rejecting both the R, G, and B video components and the DC common mode current used to control the differential switching diodes illustrated in FIG. 15.

FIG. 18 illustrates the details of an exemplary Rack Interconnect Circuit Channel video transmitter circuitry 130. The schematic illustrates the differential outputs with encoded common mode synchronization signals and common mode enable signal for diode multiplexing. As noted above, video transmitter circuitry 130 is located in each RIP 70. Transmitter circuit 130 includes an enable switch 132, differential video drivers unit 133, 134, 135 for R, G, B channels, respectively. Each of the video driver units includes differential video driving circuitry. Each of the differential video driver units receives a single ended video, such as, for example, switched R, G, B signals, and converts the received signals into differential video signals to be driven on the "+" and "−" outputs of each of the video driver units 133, 134, 135. The R, G, B pairs provide differential paths for the R, G, B video signals and the video synchronization information contained on $H_{sync}$ and $V_{sync}$ signals. Each of the R, G, and B signals are centered around a common mode voltage which is defined as the sum of the enable voltages for each of R, G, B channels coming out of the enable switch 132 and the scaled $H_{sync}$ and $V_{sync}$ values. The voltages provided by the video driver outputs are as follows:

Enabled
Green Out+=(Green+Vbias−Vssig) Volts
Green Out−=(−Green+Vbias−Vssig) Volts
Red Out+=(Red+Vbias+Vssig/2−Hssig) Volts
Red Out−=(−Red+Vbias+Vssig/2−Hssig) Volts
Red Out+=(Red+Vbias+Vssig/2+Hssig) Volts
Red Out−=(−Red+Vbias+Vssig/2+Hssig) Volts where Vssig=scaled representation of the Vertical sync signal;
Hssig=scaled representation of the Horizontal sync signal; and
Vbias=constant offset
Disabled
Green Out+=0 Volts
Green Out−=0 Volts
Red Out+=0 Volts
Red Out−=0 Volts
Red Out+=0 Volts
Red Out−=0 Volts.

Therefore, for example, if the switched R signals increase by "x" volts, then the "+" output of video driver 133 increases proportionally by "x" volts and its "−" output decreases proportionally by "x" volts. This process is similarly applicable to switched G, and switched B inputs.

Thus, for any change in the common mode voltage on any one of the three R, G, B differential outputs, there, is an equal and opposite change on one of the other outputs. These changes are caused such that the summation of the alternating currents produced by driver units 133, 134, 135 on a Category 5 (CAT5) cable due to the encoded synchronization signals is zero. This requirement is necessary in order to keep signal balance while preventing signal noise and radiation. Still referring to FIG. 18, R, G, B signals are received in the enable switch 132 from a network server 122 (FIG. 12), and video enable signal is received from a processor and a switching circuit 132 also included within RIP 70. The R, G, B signals are combined with $H_{sync}$ and $V_{sync}$ signals in respective video drivers 133, 134, 135, respectively. As noted earlier, the circuitry for combining the R, G, B, signals with $H_{sync}$ and $V_{sync}$ signals resides in each of the video driver units included within RIP 70.

Figure 19:
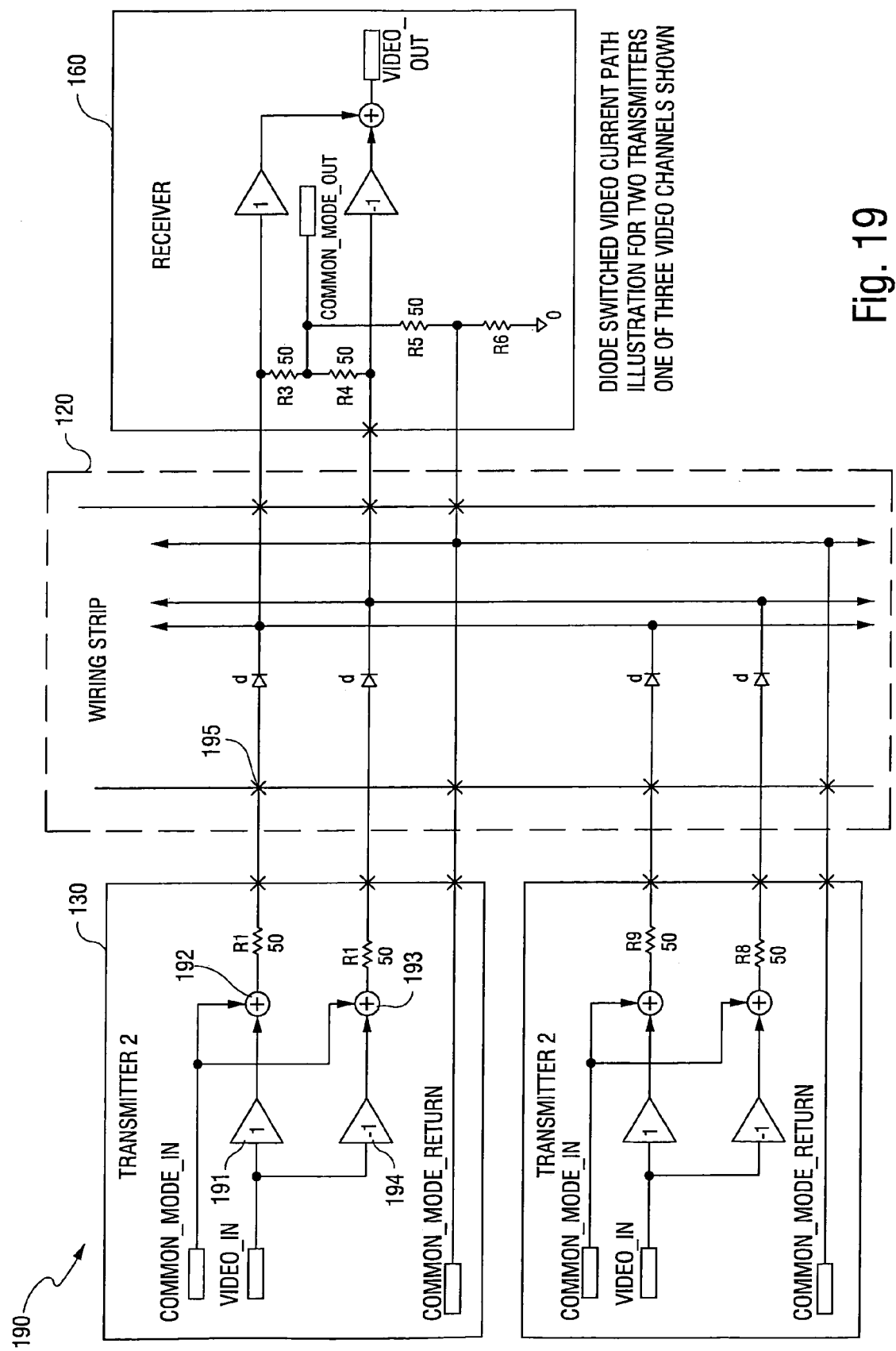
FIG. 19 illustrates a Rack Interconnect Channel (RIC) circuit including a receiver circuit in accordance with an example embodiment of the present invention.

Referring now to FIG. 19, there is shown an exemplary schematic for a diode switched video current path illustrating two transmitters, each representing a channel from a RIP 70 (FIG. 7). FIG. 19 specifically shows an exemplary model of a Red channel from two different transmitters located in distinct RIPs 70. The wiring strip provides diode switching for the differential video signals and performs splitter/combiner actions for the command connection between the connected RIC/RIPs. In this exemplary Fig., VIDEO_IN is shown as a single input for the sake of brevity. It will, however, be understood that R, G, and B signals would be present for each VIDEO_IN depicted with respect to each transmitter 130. Common mode signals, generated as shown in FIG. 20, are combined with VIDEO_IN signals via exemplary buffers and summing nodes. The combined common mode and VIDEO_IN signals pass through source end terminations 195 pass through the diodes "d", in the wiring strip 120, and are summed together in port 1209 of the wiring strip 120 (FIG. 12). The video signals are received in the receiver (FIG. 16) located in the RCM 116.

In operation, for example, if one were to turn common mode (CM) voltage on Transmitter 1 to an ON state and place synchronization (sync) signals on the CM voltage signal, and turn CM voltage on Transmitter 2 to a "zero" state and turn its video OFF, then Transmitter 2 is turned OFF and the diodes, "d" in the wiring strip 120 associated with Transmitter 2 are reverse biased and removed from the bus in the wiring strip 120. Thus, switching of active video signals through the wiring strip 120 is accomplished by sourcing current through diodes "d" associated with an active channel while reverse biasing the diodes "d" associated with inactive channels. This switching mechanism along, with switching off the active video drive on inactive RIPs 70 effectively prevents unwanted video "bleed through" due to diode capacitance, and thus eliminates transmission line stub effects from the inactive RIPs cabling.

Figure 23:
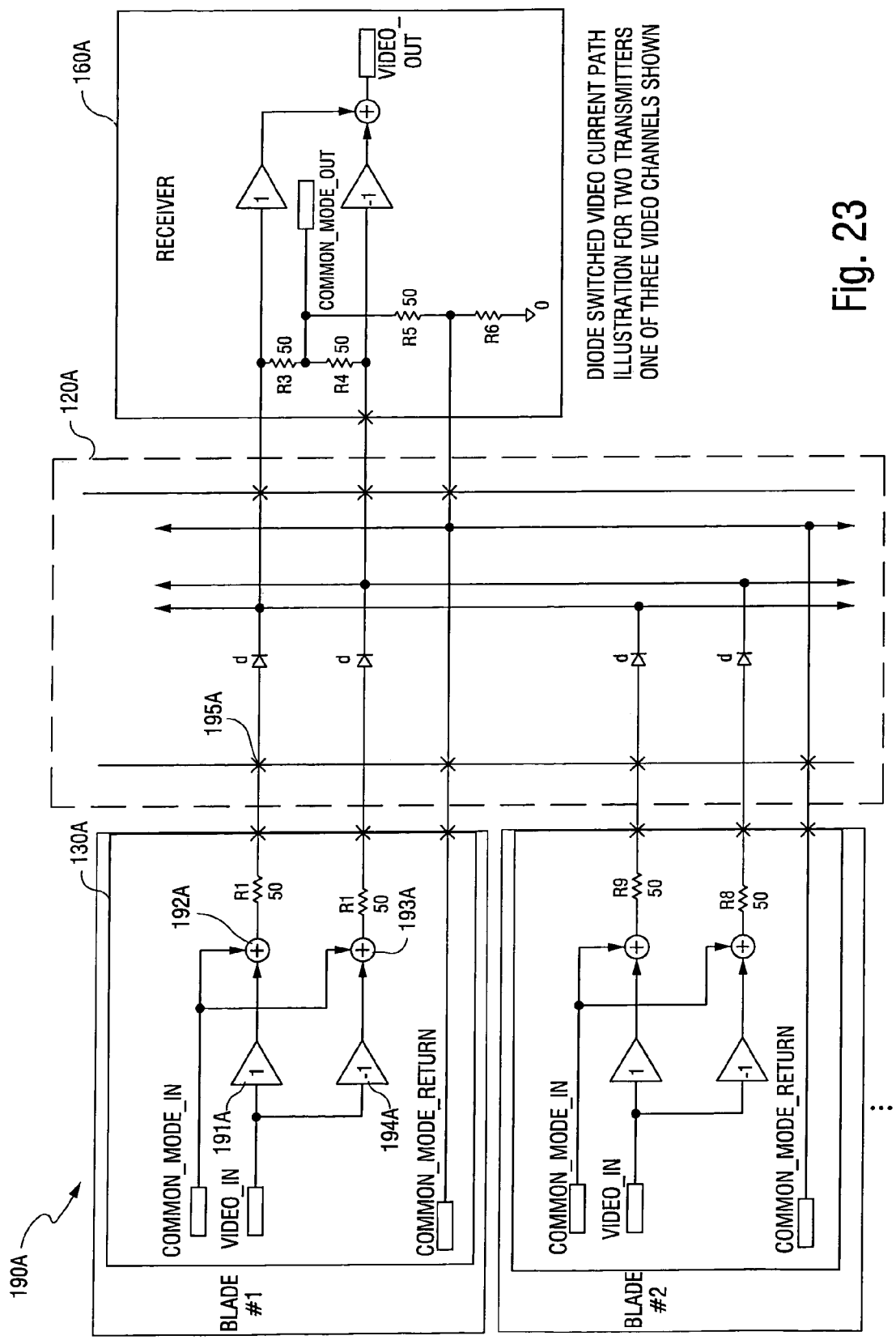
FIG. 23 illustrates an alternative example embodiment of a rack interconnect channel circuit incorporated into a blade server architecture.

FIG. 23 illustrates another example embodiment of a diode switched video current path employed in a blade server architecture. The artisan will understand known blade server architectures and their operation, in which multiple servers (or "blades") are connected into a common backplane. The present invention has application in such a blade architecture as, for example, is shown in FIG. 23.

From a comparison of FIGS. 19 and 23, one will see that the structure and operation of the blade architecture systems (FIG. 23) have correspondences in the wiring strip embodiment (FIG. 19). Indeed, the above description of the operation of the system of FIG. 19 finds equal application with respect to the system of FIG. 23 and is incorporated again herein. In the blade architecture, the transmitters (FIG. 19) are replaced by cards that plug into a backplane (FIG. 23) rather than a wiring strip. Otherwise, the operation is identical. Although only two cards are shown in FIG. 23, as many as the backplane will physically accommodate (including sealing) are envisioned. Similarly, the architecture of FIG. 23 is not limited as to the number of receivers on the backplane, though only one is shown.

As shown in FIG. 23, the diode switches are located on the backplane itself. The RIPs are preferably located in the blades.

References numbers 190A-195A, 130A, 120A and 160A in FIG. 23 all correspond to, respectively, their counterpart numbers 190-195, 130, 120 and 160 in FIG. 19 in function, operation, and relationship with the remaining architecture as a whole.

Referring now to FIG. 20, there is shown an exemplary circuit diagram for combining $H_{sync}$ and $V_{sync}$ signals with common mode signals. Circuit 200 includes resistive summing nodes 201, 202, 203 and Vbias (enable voltage). The $H_{sync}$ and $V_{sync}$ signals combine with enable voltage for each of the R, G, B signals to produce a respective common mode voltage.

Once the video signals are received by RCM 116, they are digitized and the changes in the video are observed by monitoring screen-to-screen changes in the video, and tracking the changes via Ethernet LAN 110 by the remote user 112.

Figure 21:
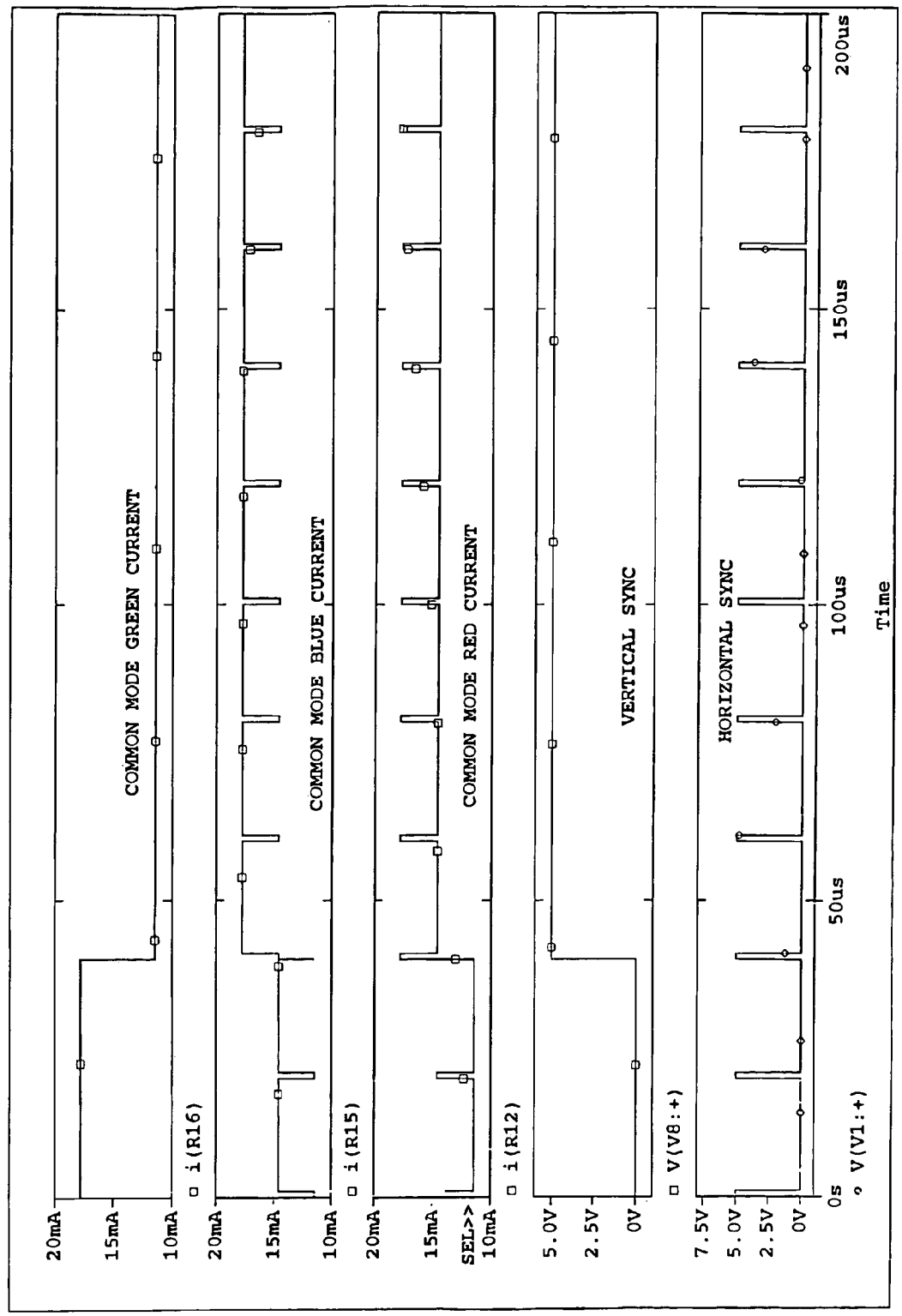
FIG. 21 illustrates a plot for common mode Red, Green, Blue synchronization signals as a function of $H_{sync}$ and $V_{sync}$ signals according to an example embodiment of the present invention.

FIG. 21 depicts an, exemplary plot showing the relationship of common mode R, G, B signals as a function of $H_{sync}$ and $V_{sync}$ signals. As one can see from the depicted exemplary plot, the AC component of CM Green is shown as inverted $V_{sync}$; the AC component CM blue is shown as $\frac{1}{2} V_{sync} - H_{sync}$; and the AC component CM Red is shown as $\frac{1}{2} V_{sync} + H_{sync}$.

Figure 22:
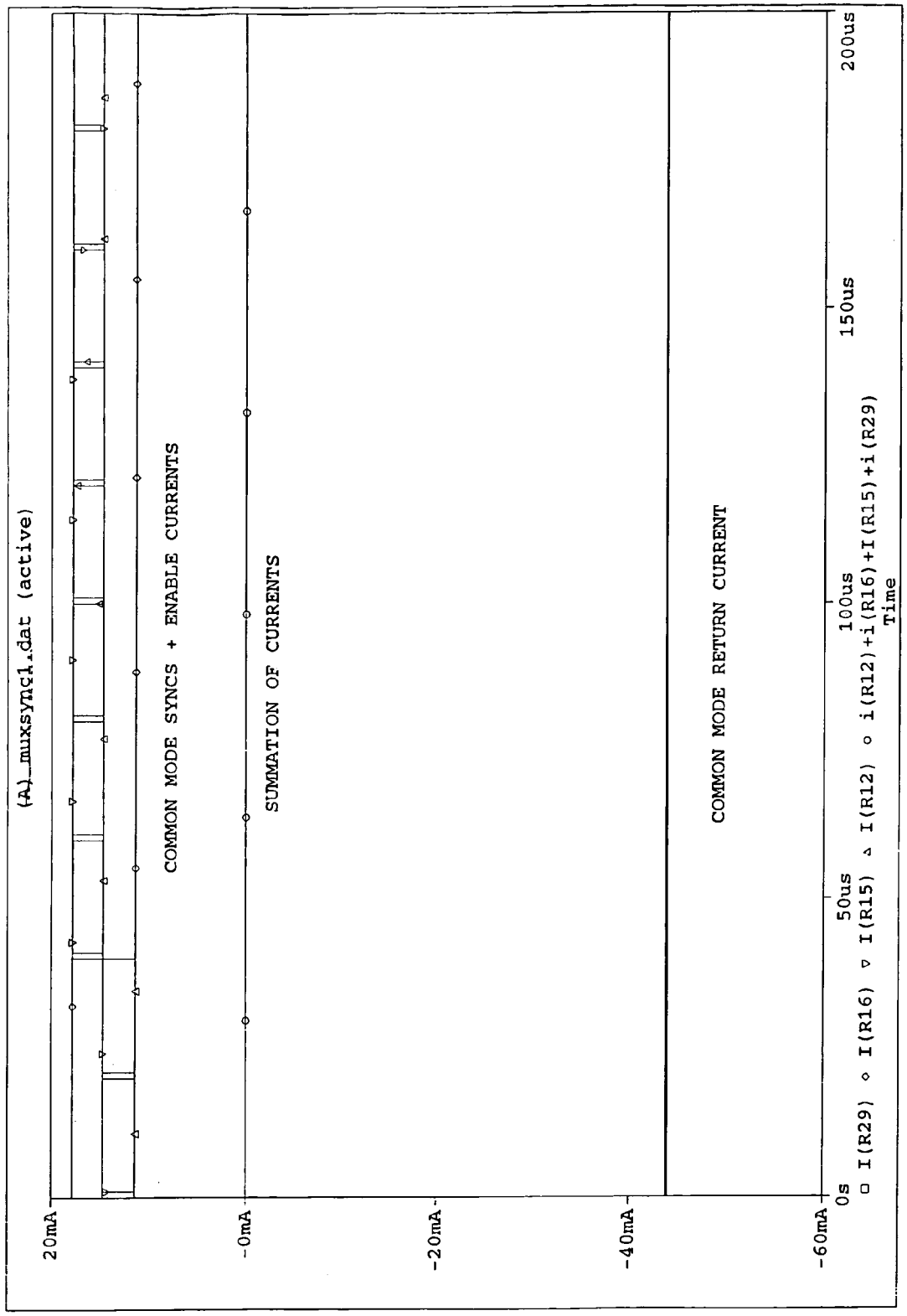
FIG. 22 illustrates a plot showing summation of currents from a transmitter to a receiver in accordance with an example embodiment of the present invention.

FIG. 22 depicts an exemplary plot showing that the summation of alternating currents from a transmitter to a receiver via the R, G, B, common mode (CM) signals equals to zero. The overlayed common mode sync signals shown in the plot represent common mode sync signals as shown in FIG. 21. The common mode return current is, the summation of all CM currents flowing from the R, G, and B drivers to the receiver. Thus, the summation of the common mode syncs and the enable current less the return signals equals zero.

This method of switching video is inexpensive and it further provides flexibility in dealing with the management of servers. For example, 8×1 multiplexing or N times 8×1 multiplexing is possible with no power source required for the switching elements. The system of the present invention consumes low power and is effective placed into server rack systems. Further, several wiring strips may be mounted within a rack, the wiring strips outputs may then be routed to an RCM in another rack for administration purposes.

FIGS. 24A-24-B (from the priority application, application Ser. No. 60/279,461) show a RIP according to embodiments of the present invention. The RIP in FIGS. 24A-24B has two connectors located in the main body and integral therewith. The connection ports are each constructed and adapted to receive an RJ45-type (CAT5) connection plug, and the main body has a lump-in-cable design. Each of the connectors has respective connection ports electrically connected to the RIP electrical circuitry enclosed in the main body.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A device for use in a system for processing keyboard, video and mouse signals, the device comprising:
    a main body enclosing circuitry;
    a video connector connected to a video port of a computer, said video connector including a VGA-type video port connection plug having an outer housing;
    a first cable having one end integrally connected to said main body, and having its other end directly connected to and within the outer housing of said video connector and operatively connected to the video port;
    a mouse connector connected to a mouse port of said computer, said mouse connector including a mouse port connection plug;
    a second cable having one end directly connected to and within said outer housing of said video connector and having its other end connected to said mouse connector;
    a keyboard connector connected to a keyboard port of said computer, said keyboard connector including a keyboard port connection plug;
    a third cable having one end directly connected to and within said outer housing of said video connector and having its other end connected to said keyboard connector;
    at least one other connector located in said main body and integral therewith, each said at least one other connector having at least one respective connection port electrically connected to said circuitry.

2. A device as in claim 1, having exactly one other connector.

3. A device as in claim 1, having exactly two other connectors.

4. A device as in claim 1, wherein said device is compliant with Device Data Channel level 2B (DDC2B) format.

5. A device as in claim 1, wherein, when connected to a computer, said device is disposed external to a housing of said computer and in close proximity to said housing.

6. A device as in claim 1, wherein said circuitry is further constructed and adapted to receive at least some of video, keyboard, and mouse signals from a computer connected to the video, keyboard, and mouse connectors and to provide those signals to a processor within said circuitry.

7. A device as in claim 1, wherein said mouse and keyboard port connection plugs are each selected from the group consisting of USB-type connection plugs and PS-2-type connection plugs.

8. A device as in claim 1, wherein said circuitry comprises an active circuit and wherein said keyboard connector is constructed and adapted to allow said device to operate in a keep-alive mode.

9. A device as in claim 1, wherein, when connected to a computer, said device is disposed external to a housing of said computer and closer to said housing than to a server connected to the network connector.

10. A device as in claim 1 wherein the first, second and third cables provide electrical connection between the circuitry and the video port connection plug, the mouse port connection plug and the keyboard port connection plug.

11. A device as in claim 1, wherein, when connected to a computer, said circuitry in said device is powered from said computer.

12. A device comprising:
    circuitry enclosed in a circuitry housing;
    a first cable electrically connected to the circuitry and integral with the circuitry housing;
    a master plug housing including a video port connection plug having associated pins electrically connected to the circuitry via the first cable that is connected to and within the master lug housing;
    a mouse port connection plug having associated pins electrically connected to the circuitry via a path directly within and through the master plug; and
    a keyboard connection plug having associated pins electrically connected to the circuitry via a path directly within and through the master plug.

13. A device as in claim 12 wherein the circuitry housing includes at least one other connector, integral therewith and electrically connected to said circuitry.

14. A device as in claim 13 wherein the at least one other connector is constructed and adapted to receive an RJ45-type connection plug.

15. A device as in claim 12, wherein said mouse and keyboard port connection plugs are each selected from USB-type plugs and PS-2-type plugs.

16. A device as in claim 12 wherein the mouse port connection plug is connected via a second cable directly connected to and within the master plug.

17. A device as in claim 12 wherein the keyboard port connection plug is connected via a third cable directly connected to and within the master plug.

18. A device comprising, in combination:
circuitry enclosed in a circuitry housing having a molded design;
a video port connection plug;
a first cable having one end thereof electrically connected to the circuitry and being integrally connected with the circuitry housing, and having another end thereof connected to and within a housing of the video port connection plug, the first cable providing electrical connection between the circuit and associated pins within at least the video connection plug;
a mouse port connection plug having associated pins electrically connected to the circuitry via a second cable directly connected to and within the housing of the video connection plug, the mouse port connection plug being selected from a USB plug and a PS-2 plug;
a keyboard port connection plug having associated pins electrically connected to the circuitry via a third cable directly connected to and within the housing of the video port connection plug, the keyboard port connection plug being selected from a USB plug and a PS-2 plug; and
at least one network connector located in the housing of the circuitry and integral therewith, the network connector being electrically connected to the circuitry, wherein the network connector is constructed and adapted to receive an RJ45-type connection plug.

19. A connection system comprising:
a video port connection plug, a mouse port connection plug and a keyboard port connection plug;
a molded housing enclosing an electrical circuit; and
first, second and third cables,
wherein the first cable electrically connects associated pins within the video port connection plug to the circuit, the second cable electrically connects associated pins within the mouse port connection plug to the circuitry via a second cable sheathing directly connected to and within a housing of the video port connection plug and via the first cable that is also connected to and within the video port connection plug housing, and the third cable electrically connects associated pins within the keyboard port connection plug to the circuitry via a third cable sheathing that is also directly connected to and within the housing of the video port connection plug and via the first cable.

20. A connection system comprising:
a VGA plug, a USB mouse port plug and a USB keyboard port plug;
an electrical circuit enclosed within a molded housing;
wherein a first cable electrically connects the VGA plug to the electrical circuit via the molded housing, a second cable electrically connects the USB mouse port plug to the circuitry via a second cable sheathing directly connected to and within a housing of the VGA plug and via the first cable having first cable sheathing that is also connected to and within the VGA plug housing, and a third cable electrically connects the USB keyboard port plug to the circuitry via a third cable sheathing directly connected to and within the housing of the VGA plug and via the first cable.

21. A connection system comprising:
a video port connection plug, a mouse port connection plug and a keyboard port connection plug; and
a molded housing enclosing an electrical circuit,
wherein electrical signals from the mouse port and keyboard port connection plugs are routed to the electrical circuit via a direct connection through and within a housing of the video port connection plug.

22. A connection system comprising:
a video port connector, a mouse port connector and a keyboard port connector; and
an enclosed electrical circuit,
wherein electrical signals from the video, mouse and keyboard connectors are routed to the electrical circuit via direct connections through and within a housing of one of the connectors and a first cable operatively connected between the housing and the enclosed electrical circuit.

23. A method of connecting a computer to a switch in a keyboard, video, mouse system, the method comprising:
providing circuitry in a housing;
providing a first cable having one end thereof being integral with the housing and electrically connected to the circuitry;
providing a video port connection mechanism which includes a video port connection plug for connecting to a video port of the computer, the video port connection plug being electrically connected via the first cable to the circuitry in the housing with its other end directly connected to and within the video port connection mechanism;
providing a mouse port connection mechanism which includes a mouse port connection plug for connecting to a mouse port of the computer, the mouse port connection plug being electrically connected via a path directly through and within the video port connection mechanism to the circuitry in the housing;
providing a keyboard port connection mechanism which includes a keyboard port connection plug for connecting to a keyboard port of the computer, the keyboard port connection plug being electrically connected via a path directly through and within the video port connection mechanism to the circuitry in the housing; and
providing at least one other network connector integral with said housing, said network connector having a connection port electrically connected to the circuitry.

24. A method as in claim 23 wherein the video port connection plug is a VGA-type connection plug and wherein the mouse and keyboard port connection plugs are each selected from USB-type and PS-2-type plugs.

25. A method as in claim 23 wherein, when the video port connection plug is connected to the computer, the housing is disposed external a housing of the computer and in close proximity thereto.

26. A method for facilitating connection between keyboard, video, and mouse ports of a computer and a keyboard, video, mouse (KVM) device, the method comprising:
(A) providing a rack interface pod (RIP) comprising:
a body having a molded design and enclosing circuitry;
a video connector connected to a video port of the computer, said video connector including a video port connection plug having associated pins electrically connected to the circuitry in the body via a first cable operatively connected there between and to and within the video connector and the body;

a mouse connector connected to a mouse port of the computer, the mouse connector including a mouse port connection plug having associated pins electrically connected, via a path directly through and within the video connector, to the circuitry in the body;

a keyboard connector connected to a keyboard port of the computer, the keyboard connector including a keyboard port connection plug electrically connected, via a path directly through and within the video connector, to the circuitry in the body; and an other connector located in said main body and integral therewith, said other connector having a connection port electrically connected to the circuitry; and (B) causing the video connector, mouse connector, and keyboard connector to be used to connect to the keyboard port, video port, and mouse port of the computer, respectively; and (C) causing the other connector to be used to connect the RIP to the KVM device.

27. A rack interface pod (RIP) for use in a system for processing keyboard, video, and mouse signals, the device comprising:

means for enclosing circuitry;

video connection means for connecting to a video port of a computer, said video connection means including a VGA-type video port connection plug;

a first cable having one end integrally connected to said means for enclosing circuitry, and having its other end connected to and within a housing of said video connection means;

mouse connection means for connecting to a mouse port of a computer, said mouse connection means including a mouse port connection plug;

a second cable having one end thereof directly connected to and within said housing of said video connection means and having its other end connected to said mouse connection means;

keyboard connection means for connecting to a keyboard port of a computer, said keyboard connection means including a keyboard port connection plug;

a third cable having one end thereof directly connected to and within said housing of said video connection means and having its other end connected to said keyboard connection means; and other connection means integral with said means for enclosing circuitry, said other connection means having a connection port electrically connected to said circuitry.

28. A method for facilitating connection between keyboard, video, and mouse ports of a computer and a keyboard, video, mouse (KVM) device, the method comprising:

(A) providing a rack interface pod (RIP) comprising:
  (a1) a body having a molded design and enclosing circuitry;
  (a2) a video connector connected to a video port of the computer, said video connector including a video port connection plug electrically connected via a path through a first cable located within a first cable sheathing to the circuitry in the body, the first cable sheathing having one end connected to the body and its other end directly connected to and within the video connector;
  (a3) a mouse connector connected to a mouse port of a computer, the mouse connector including a mouse port connection plug having associated pins electrically connected, via an electrical path physically located within and passing through the video connector, to the circuitry in the body;
  (a4) a keyboard connector constructed and adapted to connect to a keyboard port of a computer, the keyboard connector including a keyboard port connection plug having associated pins electrically connected, via an electrical path physically located within and passing through the video connector, to the circuitry in the body; and
  (a5) a device connector located in said main body and integral therewith, said device connector having a connection port electrically connected to the circuitry; and (B) causing the RIP to be used to connect the keyboard, video, and mouse ports of the computer to the KVM device.

29. A device connectable to keyboard, video, and mouse ports of a computer, the device comprising:

a body having a molded design and enclosing circuitry;

a video port connector connected to a video port of the computer, said video port connector including a video port connection plug electrically connected via a path through a first cable located within a first cable sheathing to the circuitry in the body, the first cable sheathing having one end connected to the body and its other end directly connected to and within the video port connector;

a mouse port connector connected to a mouse port of the computer, the mouse port connector including a mouse port connection plug having associated pins electrically connected, via a physical path within and through the video port connector, to the circuitry in the body;

a keyboard port connector connected to a keyboard port of the computer, the keyboard port connector including a keyboard port connection plug having associated pins electrically connected, via a physical path within and through the video port connector, to the circuitry in the body; and at least one other connector located in said main body and integral therewith, said other connector having a connection port electrically connected to the circuitry in the body.

30. A device connectable to ports of a computer, the device comprising:

a body enclosing circuitry;

a master housing connected to a video port of the computer, said master housing including a video port connection plug having associated pins electrically connected via a path through a first cable sheathing to the circuitry, with one end of the first cable sheathing being connected to the body and its other end directly connected to and within the master housing; and a mouse port connector connected to a mouse port of the computer, the mouse port connector including a mouse port connection plug having associated pins electrically connected via mouse a cable located inside mouse cable sheathing to the circuitry, the mouse cable residing within, in order, a mouse plug containing the associated pins, the mouse port connector, the mouse cable sheathing connected to and within the master housing, the master housing, the first cable sheathing and the body.

31. A device connectable to ports of a computer, the device comprising:

a body enclosing circuitry;

a master housing connected to a video port of the computer, said master housing including a video port connection plug having associated pins electrically connected via a path through a first cable sheathing to the circuitry, with one end of the first cable sheathing being connected to the body and its other end directly connected to the master housing; and a keyboard port connector connected to a keyboard port of the computer, the keyboard port connector including a keyboard port connection plug having associated pins electrically connected via a keyboard cable located inside keyboard cable sheathing connected to and within the master housing, to the circuitry, the keyboard cables residing within, in order a keyboard plug containing the associated pins, the keyboard port connector, the keyboard cable sheathing, the master housing, the first cable sheathing and the body.

32. A device connectable to ports of a computer, the device comprising:

a body enclosing circuitry physically in line with a first cable sheathing;

a master housing connected to a video port of the computer, said master housing including a video port connection plug having associated pins electrically connected via video cables to the circuitry, the video cables residing within, in order, the video port connection plug, the master housing, the first cable sheathing and the body, with one end of the first cable sheathing being connected to the body and its other end directly connected to and within the master housing.

33. A device connectable to ports of a computer, the device comprising:

a body enclosing circuitry;

a master housing connected to a video port of the computer, said master housing including a video port connection plug having associated pins electrically connected via video cables located within a first cable sheathing to the circuitry, the video cables residing within, in order, the video port connection plug, the master housing, the first cable sheathing and the body, with one end of the first cable sheathing being connected to the body and its other end directly connected to and within the master housing; and a mouse port connector connected to a mouse port of the computer, the mouse port connector including a mouse port connection plug having associated pins electrically connected via mouse cables to the circuitry, the mouse cables residing within, in order, a mouse plug containing the associated pins, the mouse port connector, a mouse cables sheathing, the master housing, the first cable sheathing and the body, and with one end of the mouse cables sheathing being connected to the mouse port connector and the other end directly connected to and within the master housing.

34. A device connectable to ports of a computer, the device comprising:

a body enclosing circuitry;

a master housing connected to a video port of the computer, said master housing including a video port connection plug having associated pins electrically connected via video cables to the circuitry, the video cables residing within, in order, the video port connection plug, the master housing, a first cable sheathing and the body, with one end of the first cable sheathing being connected to the body and its other end directly connected to and within the master housing; and a keyboard port connector connected to a keyboard port of the computer, the keyboard port connector including a keyboard port connection plug having associated pins electrically connected via keyboard cables to the circuitry, the keyboard cables residing within, in order a keyboard plug containing the associated pins, the keyboard port connector, a keyboard cables sheathing, the master housing, the first cable sheathing and the body, and with one end of the keyboard cables sheathing being connected to the keyboard port connector and the other end directly connected to and within the master housing.

35. A device connectable to ports of a computer, the device comprising:

a body enclosing circuitry;

a master housing connected to a video port of the computer, said master housing including a video port connection plug having associated pins electrically connected via video cables, to the circuitry, the video cables residing within, in order, the video port connection plug, the master housing, a first cable sheathing connected to and within the master housing and to the body, with one end of the first cable sheathing being connected to the body and its other end directly connected to and within the master housing;

mouse port connector connected to a mouse port of the computer, the mouse port connector including a mouse port connection plug having associated pins electrically connected via mouse cables to the circuitry, the mouse cables residing within, in order, a mouse plug containing the associated pins, the mouse port connector, a mouse cables sheathing connected to and within the master housing, the master housing, the first cable sheathing and the body, and with one end of the mouse cables sheathing being connected to the mouse port connector and the other end directly connected to and within the master housing; and a keyboard port connector connected to a keyboard port of the computer, the keyboard port connector including a keyboard port connection plug having associated pins electrically connected via keyboard cables to the circuitry, the keyboard cables residing within, in order a keyboard plug containing the associated pins, the keyboard port connector, a keyboard cables sheathing connected to and within the master housing, the master housing, the first cable sheathing and the body, and with one end of the keyboard cables sheathing being connected to the keyboard port connector and the other end directly connected to and within the master housing.

36. A device connectable to ports of a computer, the device comprising:

a body enclosing circuitry;

a master housing connected to a video port of the computer, said master housing including a video port connection plug having associated pins electrically connected via video cables to the circuitry, the video cables residing within, in order, the video port connection plug, the master housing, a first cable sheathing connected to and within the master housing and the body;

a mouse port connector connected to a mouse port of the computer, the mouse port connector including a mouse port connection plug having associated pins electrically connected via mouse cables to the circuitry, the mouse cables residing within, in order a mouse plug containing the associated pins, the mouse port connector, a mouse cables sheathing connected to and within the master housing, the master housing, the first cable sheathing and the body; and a keyboard port connector connected to a keyboard port of the computer, the keyboard port connector including a keyboard port connection plug having associated pins electrically connected via keyboard cables to the circuitry, the keyboard cables residing within, in order a keyboard plug containing the associated pins, the keyboard port connector, a keyboard cables sheathing connected to and within the master housing, the master housing, the first cable sheathing and the body;

wherein the master housing directly receives and retains therein one end of each of the mouse cables sheathing, the keyboard cables sheathing and the first cable sheathing.

37. A device connectable to ports of a computer, the device comprising:

a body enclosing circuitry;

a master housing connected to a video port of the computer, said master housing including a video port connection plug having associated pins electrically connected via video cables to the circuitry, the video cables residing within, in order, the video port connection plug, the master housing, a first cable sheathing connected to and within the master housing and the body, with one end of the first cable sheathing being connected to the body and its other end directly connected to and within the master housing; and a keyboard port connector connected constructed and adapted to connect to a keyboard port of the computer, the keyboard port connector including a keyboard port connection plug having associated pins electrically connected via keyboard cables, located within a second cable sheathing, to the circuitry, the keyboard cables residing within, in order a keyboard plug containing the associated pins, the keyboard port connector, the second cable sheathing connected to and within the master housing, the master housing, the first cable sheathing and the body;

wherein video and keyboard signals pass through the first cable sheathing and the keyboard signals, but not the video signals, also pass through the second cable sheathing physically positioned within the master housing and between the corresponding keyboard port connector.

38. A device connectable to ports of a computer, the device comprising:

a body enclosing circuitry;

a master housing connected to a video port of the computer, said master housing including a video port connection plug having associated pins electrically connected via video cables to the circuitry, the video cables residing within, in order, the video port connection plug, the master housing, a first cable sheathing and the body, with one end of the first cable sheathing being connected to the body and its other end directly connected to and within the master housing;

a mouse port connector connected to a mouse port of the computer, the mouse port connector including a mouse port connection plug having associated pins electrically connected via mouse cables, located within a second cable sheathing, to the circuitry, the mouse cables residing within, in order a mouse plug containing the associated pins, the mouse port connector, the second cable sheathing, the master housing, the first cable sheathing and the body; and wherein video and mouse signals pass through the first cable sheathing, and wherein the mouse signals, but not the video signals, also pass through the second cable sheathing physically positioned within the master housing and between the corresponding mouse port connector.

39. A device connectable to ports of a computer, the device comprising:

a body enclosing circuitry;

a master housing connected to a video port of the computer, said master housing including a video port connection plug having associated pins electrically connected via video cables to the circuitry, the video cables residing within, in order, the video port connection plug, the master housing, a first cable sheathing and the body, with one end of the first cable sheathing being connected to the body and its other end directly connected to and within the master housing;

a mouse port connector connected to a mouse port of the computer, the mouse port connector including a mouse port connection plug having associated pins electrically connected via mouse cables located within a second cable sheathing to the circuitry, the mouse cables residing within, in order a mouse plug containing the associated pins, the mouse port connector, the second cable sheathing, the master housing, the first cable sheathing and the body; and a keyboard port connector connected to a keyboard port of the computer, the keyboard port connector including a keyboard port connection plug having associated pins electrically connected via keyboard cables located within a third cable sheathing to the circuitry, the keyboard cables residing within, in order a keyboard plug containing the associated pins, the keyboard port connector, the third cable sheathing, the master housing, the first cable sheathing and the body;

wherein video, mouse and keyboard signals pass through the first cable sheathing and wherein the mouse and keyboard signals, but not the video signals, also respectively pass through the second and third cable sheathing which are respectively physically positioned within the master housing and between the corresponding mouse port connector and the keyboard port connector, and the video signals pass through no other cable sheathing other than the first cable sheathing.

40. The device as in claim 1 wherein the enclosed circuitry has a lump-in-the-cable design.

41. The RIP and system as in claim 27 wherein the circuitry has a lump-in-cable design.

42. A connection system comprising:

a video port connector including a housing and a video port connection plug;

a mouse port connector including a mouse port connection plug and a first cable connecting the mouse port connection plug directly into and within the video port connection housing, and a keyboard connector including a keyboard port connection plug and a second cable connecting the keyboard port connection plug directly into and within the video port connector housing.

* * * * *